Nov. 5, 1946.  W. J. PEARSON  2,410,743
COST COMPUTING METER
Filed March 5, 1943   12 Sheets-Sheet 1

INVENTOR.
WILLIAM J. PEARSON,
BY
ATTORNEY.

Nov. 5, 1946. W. J. PEARSON 2,410,743
COST COMPUTING METER
Filed March 5, 1943 12 Sheets-Sheet 3

INVENTOR.
WILLIAM J. PEARSON,
BY
ATTORNEY.

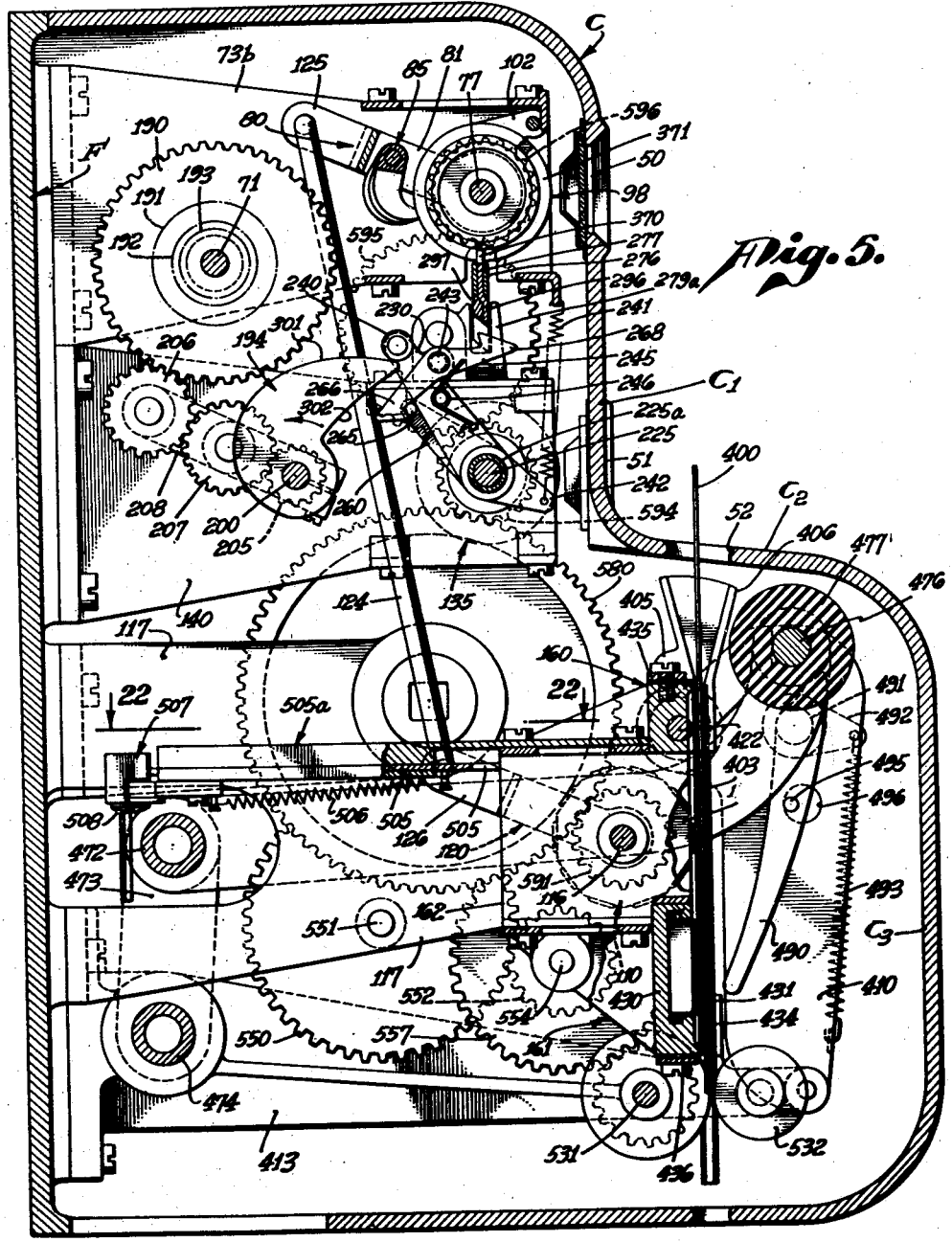

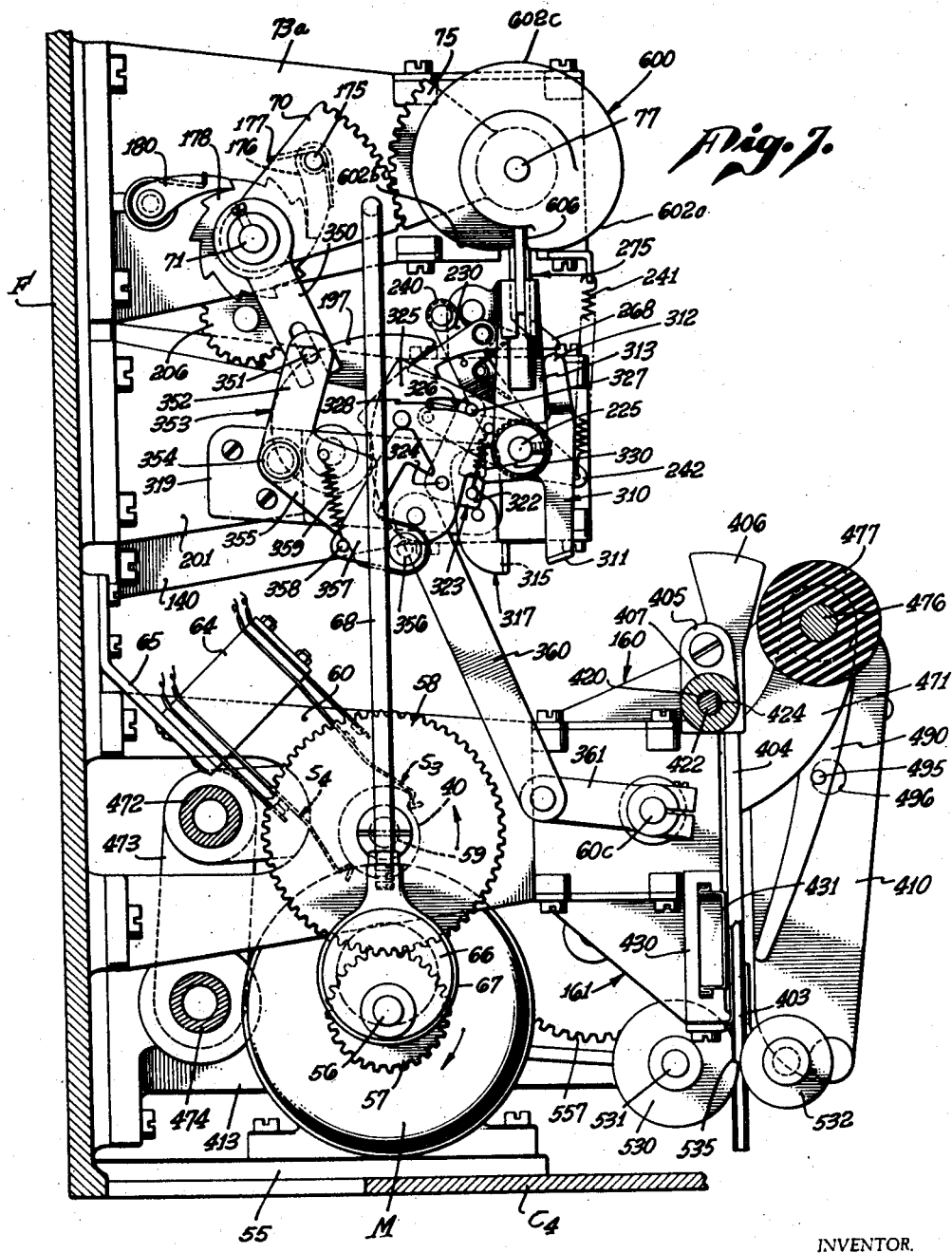

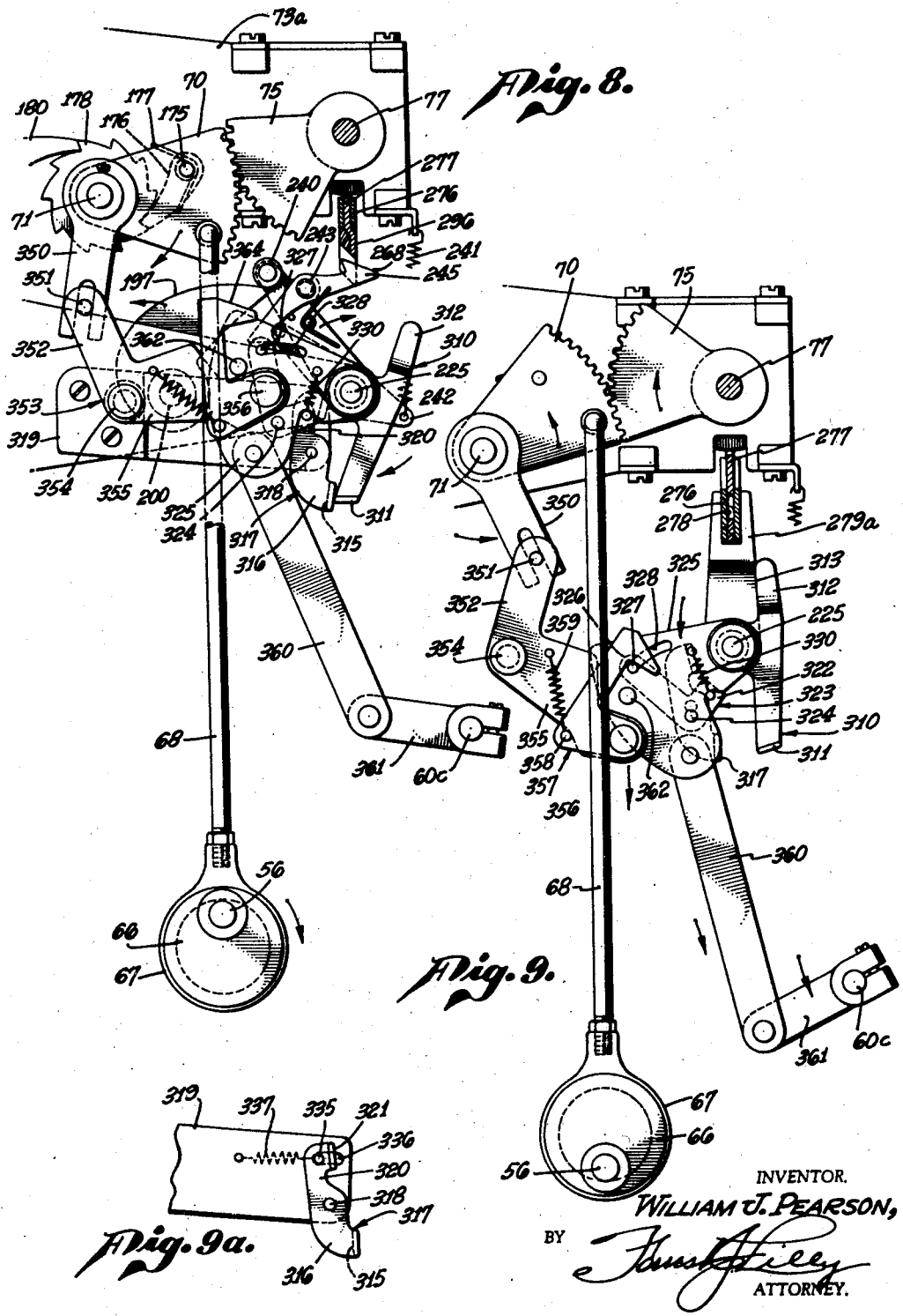

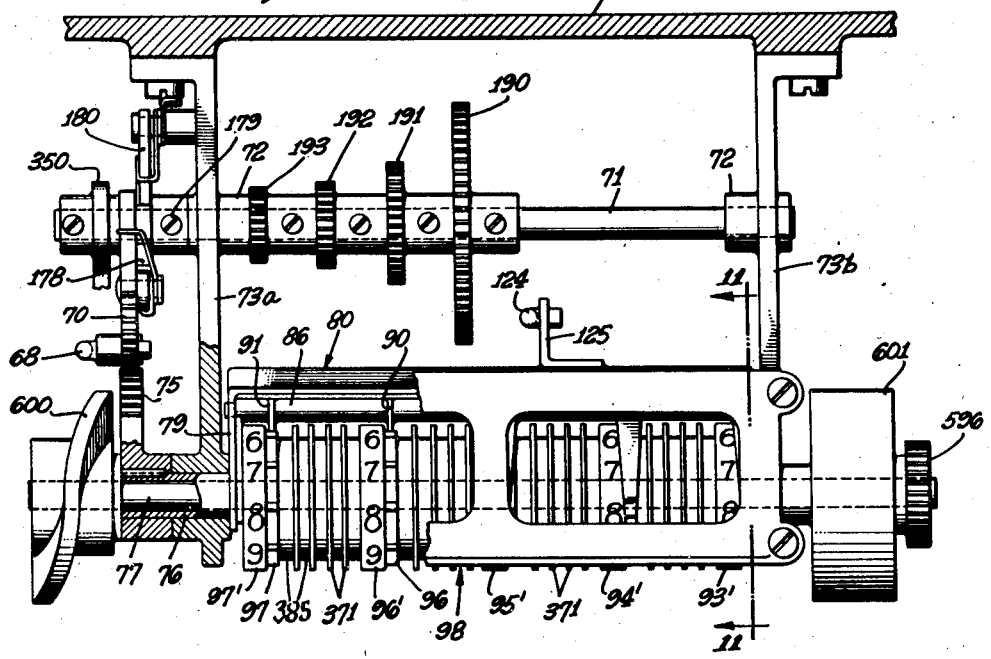
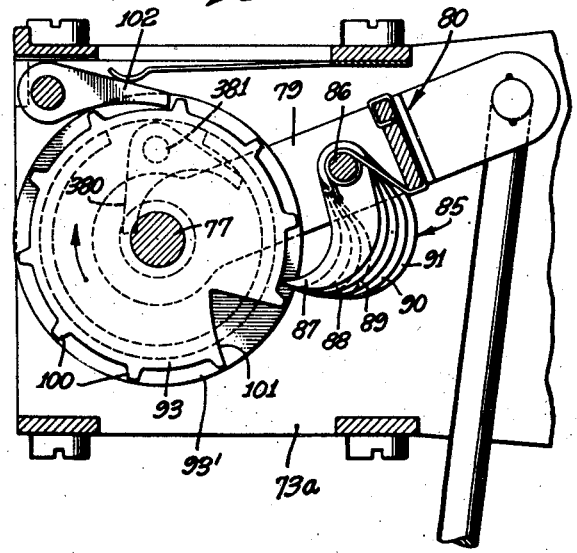
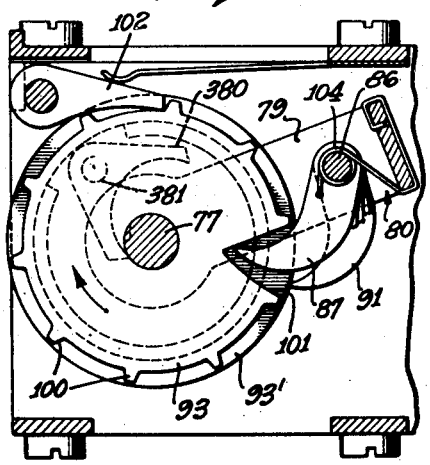

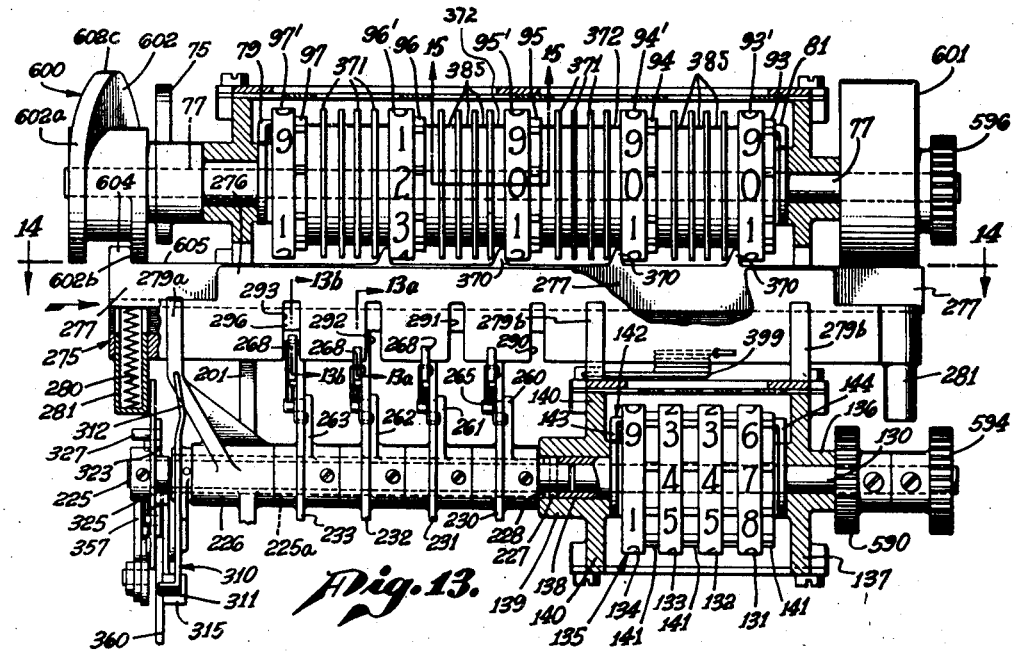
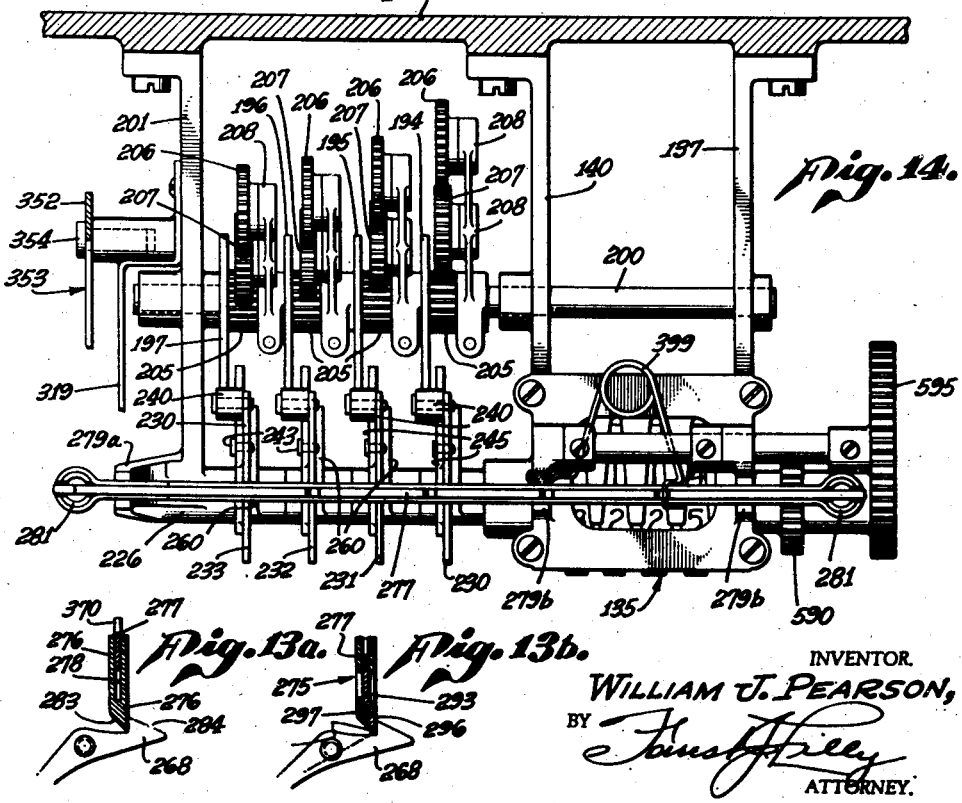

Nov. 5, 1946.  W. J. PEARSON  2,410,743
COST COMPUTING METER
Filed March 5, 1943  12 Sheets-Sheet 9

INVENTOR.
WILLIAM J. PEARSON,
BY
ATTORNEY.

INVENTOR.
WILLIAM J. PEARSON,
BY
ATTORNEY.

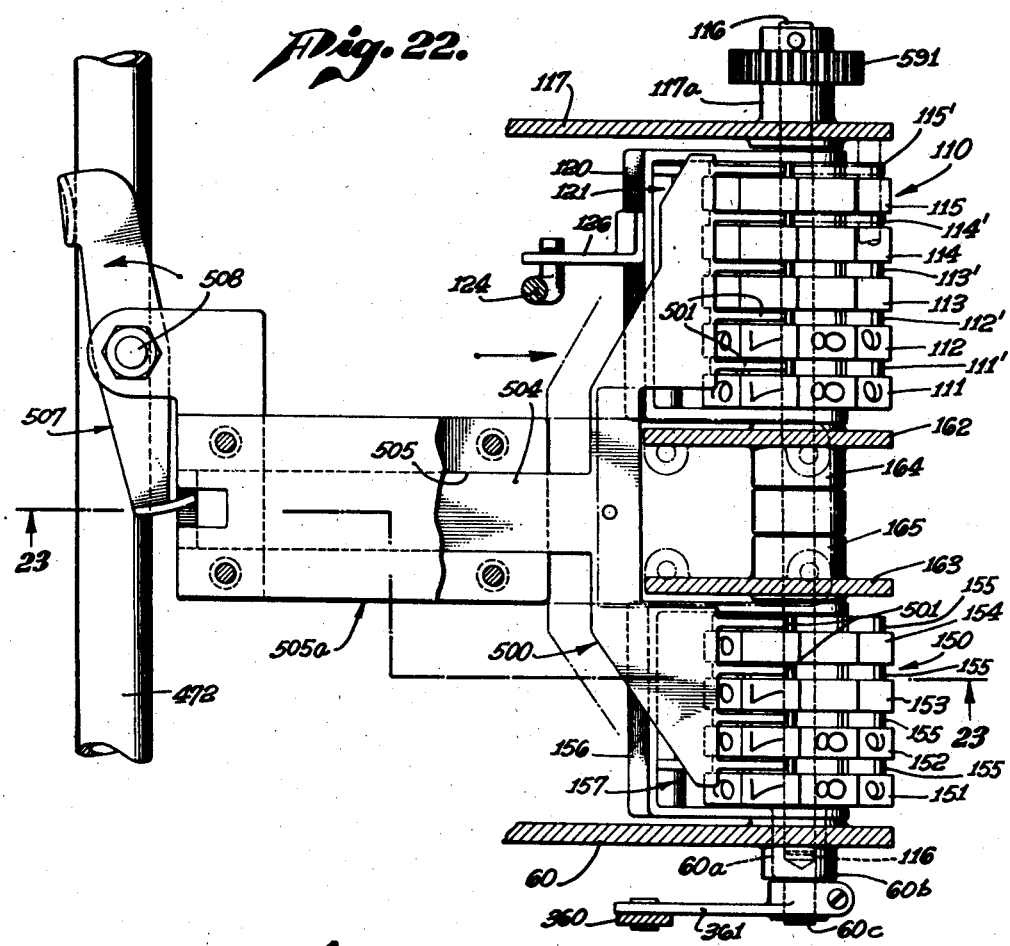
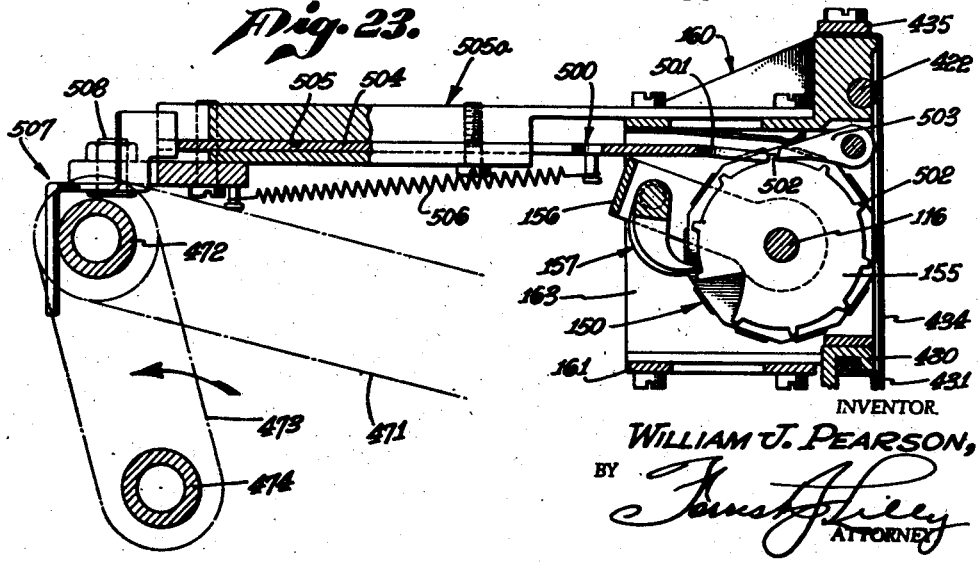

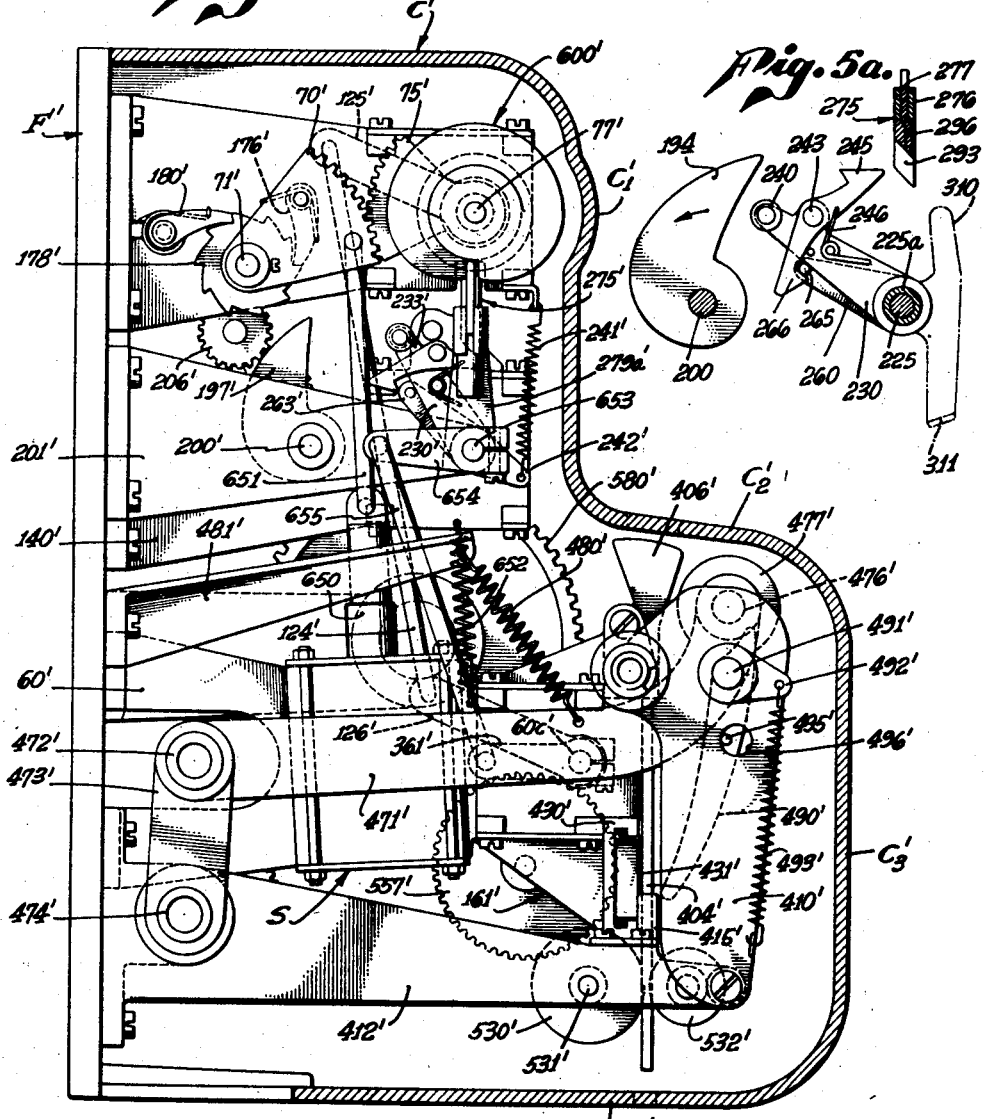
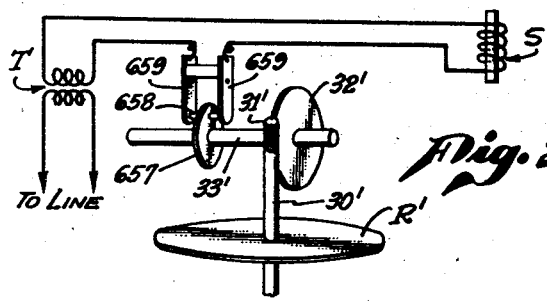
Fig. 24.
Fig. 5a.
Fig. 25.
WILLIAM J. PEARSON,
INVENTOR.

Patented Nov. 5, 1946

2,410,743

UNITED STATES PATENT OFFICE 2,410,743

COST COMPUTING METER

William J. Pearson, Los Angeles, Calif.

Application March 5, 1943, Serial No. 478,157

33 Claims. (Cl. 235—61)

This invention relates generally to meter registering and recording means for continuously registering and periodically recording the consumption of and charge made for an energy or substance furnished by a utility company, such as electrical energy, gas or water. However, while the invention is particularly applicable in connection with the furnishing of utility services, and is hereinafter described illustratively in that connection, it is not necessarily limited thereto, and may have wider application.

This present application is a continuation in part of and substitution for my prior application entitled "Meter recorder," filed May 16, 1939, Serial No. 273,981.

As is well known, it is the common present practice for a utility service company to send out meter readers, who call once a month at each consumer's residence to take a meter reading. This reading is carried back to the offices of the company, the charge calculated, and the bill mailed out. Owing to the sliding scale usually in effect, under which the rate of charge is reduced one or more times for consumptions over certain predetermined quantities, the labor involved in computation of the bills alone is somewhat substantial. That, together with the labor of printing the bills and mailing them out, amounts in the aggregate to a relatively heavy burden. It has been recognized a long while by utility companies that great savings would be effected by the provision of a suitable meter recorder which would both calculate and print the consumer's bill at his premises. The problem of providing such a recorder, however, involves very great difficulties, as there are many complicating factors to be taken into account.

The general object of the present invention is accordingly to provide a meter recorder of good mechanical design capable of computing costs on a sliding scale basis and of periodically printing a bill.

Conventional meters register total consumption since the date of installation of the meter, and a given reading must always be subtracted from a previous reading to obtain the total for the period. This involves several evident disadvantages, including the disadvantage to the consumer that he cannot easily ascertain the quantity of electricity, for example, that he is using.

A feature of the present invention is the provision of a meter recorder designed to be reset to zero at the time each bill is printed, and also the provision of visible registers showing the total consumption since resetting, and the cost, taking into account the sliding scale charge rates in effect. The consumer can accordingly always easily ascertain the quantity of energy consumed since the last reckoning, and the cost thereof.

Utility companies usually set a minimum charge for each month's service. A further feature of the invention is accordingly the provision of means whereby the quantity registration and recordation mechanism is reset to zero, but the cost registration and recordation mechanism is reset to the minimum service charge, and remains inactive until consumption equivalent to such charge has occurred.

In accordance with the present invention, the meter recorder is periodically operated by a meter reader or operator, sent out by the utility company, to print the bill for the preceding month's service. This operation, as above indicated, not only prints the bill, but resets the recorder. Preferably, and as provided in accordance with the present invention, the bill is printed in triplicate, so that two copies may be left with the consumer, one to be forwarded with his remittance, and the third turned in to the service company by the operator.

Assuming for example the case of a meter recorder in accordance with the invention adapted for use in connection with a kilowatt hour meter, a mechanism is provided adapted to be driven ahead in successive impulses in accordance with selected units of consumption, for instance, a tenth of a kilowatt. This mechanism includes visible and printing counters, directly advanced in accordance with the occurrence of such impulses, one step for each impulse. The mechanism also includes visible and printing price counters, and a plurality of rate determining means, one for each rate to be in effect, and driven at different rates by said impulses. These rate determining means are successively placed in effect to cause operation of the price counters at different rates of accumulation. These rate determining means preferably comprise rotating elements, such as cams, adapted to be rotated through different angular extents upon the occurrence of each impulse. The cams are placed in effect one after another, and are determinative of the rates of accumulating charge with accumulative energy consumption. The first cam to go into effect of course sets the highest rate of charge, and succeeding cams successively lower the charge rate. In a first phase of operation, the recorder having been reset to zero consumption, and to a minimum service charge, none of the cams are in effect. The throwing of the first cam into effect, and the succeeding changes from cam to cam, are accomplished at proper times by a special rate change means preferably controlled by one of the energy consumption counters.

The invention, as well as various objects and accomplishments not mentioned in the foregoing, will be better understood by referring now to the following detailed description of certain present illustrative embodiments thereof, reference for this purpose being had to the accompanying drawings, in which:

Fig. 5a is a view showing certain parts of Fig. 5 in another operating position;

Fig. 6 is a detail section taken on line 6—6 of Fig. 3;

Fig. 7 is a section taken on broken line 7—7 of Fig. 3;

Fig. 8 is a view showing certain operative parts of Fig. 7 in an alternative position;

Fig. 9 is another view showing certain operative parts of Fig. 7 in another operating position;

Fig. 9a is a detail view of a trip lever and mounting;

Fig. 10 is a top plan view of the meter recorder, certain parts being broken away, and certain underlying parts being omitted;

Fig. 11 is a cross-section on line 11—11 of Fig. 10;

Fig. 12 is a view similar to Fig. 11, but showing another operating position;

Fig. 13 is an enlarged and partially broken away front elevational view of the upper portion of the meter recorder, being similar to a portion of Fig. 3, but showing an alternative operating position;

Fig. 13a is a detail section on line 13a—13a of Fig. 13;

Fig. 13b is a detail section on line 13b—13b of Fig. 13;

Fig. 14 is a section taken on line 14—14 of Fig. 13;

Fig. 22 is a section on line 22—22 of Fig. 5;

Fig. 23 is a section on line 23—23 of Fig. 22;

Fig. 24 is a view similar to Fig. 4 but showing an alternative form of the invention; and Fig. 25 is a view showing an illustrative electrical circuit adapted for the modification of Fig. 24.

The invention will be disclosed through description and illustration of certain present illustrative embodiments of a meter recorder designed for the particular purpose of use in conjunction with a conventional kilowatt hour meter. From such disclosure the full scope of the invention may be gathered; it being evident that the invention may be redesigned in such manner that the kilowatt hour meter and meter recorder form one instrument, and it being further evident that by the provision of suitably modified actuating means, the meter recorder of the invention may be used in conjunction with gas or water meters, or in other analogous uses. For convenience of understanding, the meter recorder may be subdivided in description into certain components under appropriate subheadings, though the descriptions thereunder are necessarily somewhat overlapping.

Actuating means

Figure 2:
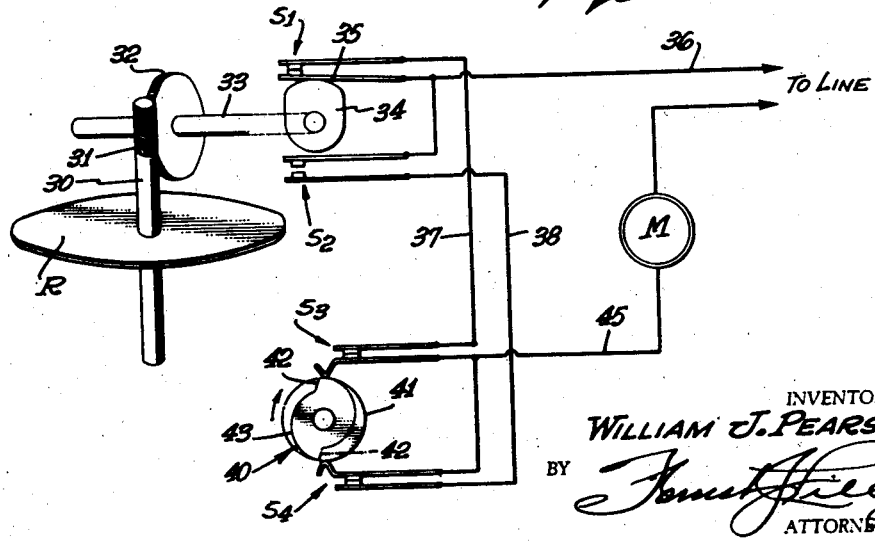
Fig. 2 is a diagrammatic view illustrating the relation between the meter recorder of the present invention and the rotor of a conventional kilowatt hour meter.

A typical actuating means in accordance with the invention will first be described. In Fig. 2, the rotor of a conventional kilowatt hour meter is indicated diagrammatically at R, and this rotor is shown as rotating a shaft 30 at the upper end of which is a worm 31. The worm 31 meshes with a worm wheel 32 upon a shaft 33, on which is mounted a switch actuating cam 34. The shafts 30 and 33 will be understood to be mounted for rotation in any suitable bearings, not illustrated, and it will be understood that the rate of rotation of rotor R, and of shafts 30 and 33, is in proportion to consumption of electrical energy. Cam 34 has a lobe 35 adapted to alternately close a pair of normally open switches $S_1$ and $S_2$, which are positioned in 180° opposition with reference to the cam. In the position shown in Fig. 2, the movable arm of switch $S_1$ is being engaged by cam lobe 35 and so held in closed position, while the movable arm of switch $S_2$ is in open position. It will be understood that when cam 34 has rotated through 180°, switch $S_1$ will be open and switch $S_2$ will be closed. The two movable or cam operated arms of switches $S_1$ and $S_2$ are connected by lead 36 to one side of the line, which may be the usual 110 volt A. C. supply circuit. The switches $S_1$ and $S_2$ and their actuating cam 34 as well as shaft 33 and gears 31 and 32 are preferably installed inside the housing of the kilowatt hour meter, and are constructed to such scale that no change or enlargement of the meter housing is required. The worm 31 and worm wheel 32 are preferably so designed that a contact will be made at either switch $S_1$ or $S_2$ for every tenth of a kilowatt hour registered by the kilowatt hour meter.

The two outside or stationary arms of switches $S_1$ and $S_2$ are connected by leads 37 and 38, respectively, to the two stationary, outside arms of a pair of normally open switches $S_3$ and $S_4$ located within the later described meter recorder housing. The two inside or movable arms of switches $S_3$ and $S_4$ are on opposite sides of a cam 40, driven as later described from an electric motor M, also located within the meter recorder housing. Cam 40 has a surface 41 of uniform radius and of at least 180° in circumferential extension adapted to engage the two movable arms of switches $S_3$ and $S_4$ and to hold said arms in closed position. At the end of this cam surface 41 is a shoulder 42 adapted to permit the movable switch arms to move towards the center of the cam to open the switches, and shoulder 42 is connected with the other or forward end of cam surface 41 by a surface 43 of gradually increasing radius. The two movable or cam actuated arms of switches S₃ and S₄ are connected by lead 45 to one side of motor M and the other side of said motor is connected to line, as indicated. The actuating means may be considered as also including certain later-described gear operated by the motor M.

Operation of the actuating means is as follows: electrical energy being consumed, rotor R of the kilowatt hour meter is in rotation at a rate of speed governed by the rate of energy consumption, and, as explained above, cam 34 rotates at such speed that switches S₁ and S₂ are alternately closed, one switch closure occurring for each 10th of a kilowatt hour of electrical energy consumed. Assume first cam 40 to be in the position indicated in dotted lines, so that switch S₄ would then be in open position and switch S³ in closed position. Then, as cam 34 closes switch S₁, a circuit is completed from the line via lead 36 to switch S₁, thence via lead 37 to switch S₃, and from switch S₃ via lead 45 to motor M, and so back to the other side of the line. Motor M will then be energized, and will drive cam 40 in the direction of the arrow. In the position shown in full lines in Fig. 2, cam 40 has rotated nearly 180° from the dotted line starting position, and has moved the movable arm of switch S₄ to closed position, while its shoulder 42 is about to move past the movable arm of switch S₃ and so permit the latter to open. This last will occur when cam 40 has moved exactly 180° from its starting position, and at such time switch S₃ will be open and switch S₄ closed. The circuit to motor M is then opened, since, although switch S₄ is closed, switch S₂ remains open. In subsequent rotation of meter driven cam 34, switch S₁ will be open and switch S₂ closed, whereupon motor M will be energized through switch S₄ and cam 40 will rotate through 180° and then stop, as before. Thus, for each closure of switches S₁ and S₂, motor M is energized and drives cam 40 through a half-revolution, whereupon the motor is deenergized and stops. This periodic operation of the motor is utilized to reciprocate certain later described members to actuate the meter recorder.

*Meter recorder housing and framework*

Figure 1:
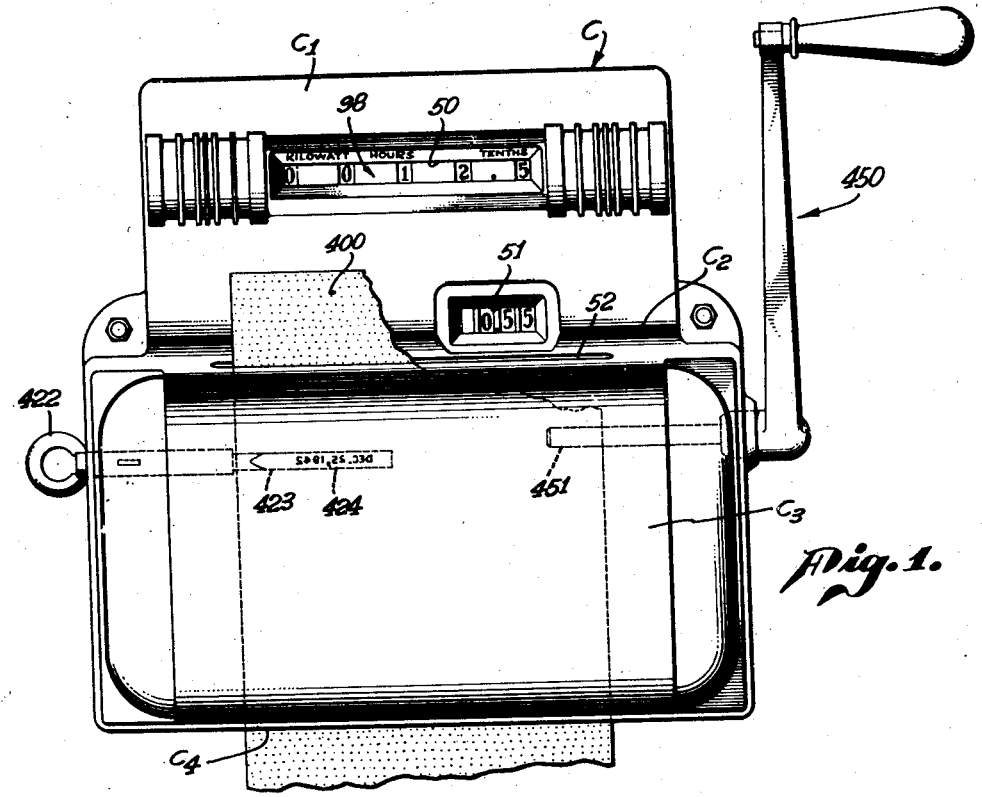
Fig. 1 is a front elevation of the meter recorder of the invention.

As mentioned heretofore, the meter recorder may be built in as an auxiliary attachment to or part of the conventional kilowatt hour meter, or it may, as here indicated, be provided as a separate unit in a separate housing. As here illustrated (Figs. 1 and 5), the meter recorder housing comprises a casing C bolted to a vertical back frame or panel F which supports the operating parts through suitable brackets secured to and projecting forwardly therefrom. Casing C embodies an upper vertically disposed front wall portion C₁ provided with upper and lower windows 50 and 51 through which the later-described kilowatt hour and price registers or counters are visible. Wall portion C₁ merges with a forwardly extending wall portion C₂, which in turn merges with a lower vertically disposed front wall portion C₃ located somewhat forwardly of wall portion C₁, and this lower front wall portion C₃ merges with the horizontal bottom wall C₄ of the casing. Horizontal casing wall portions C₂ and C₄ are provided with vertically aligned slots 52 and 53, through which the later described bill to be printed is inserted and removed.

Figure 4:
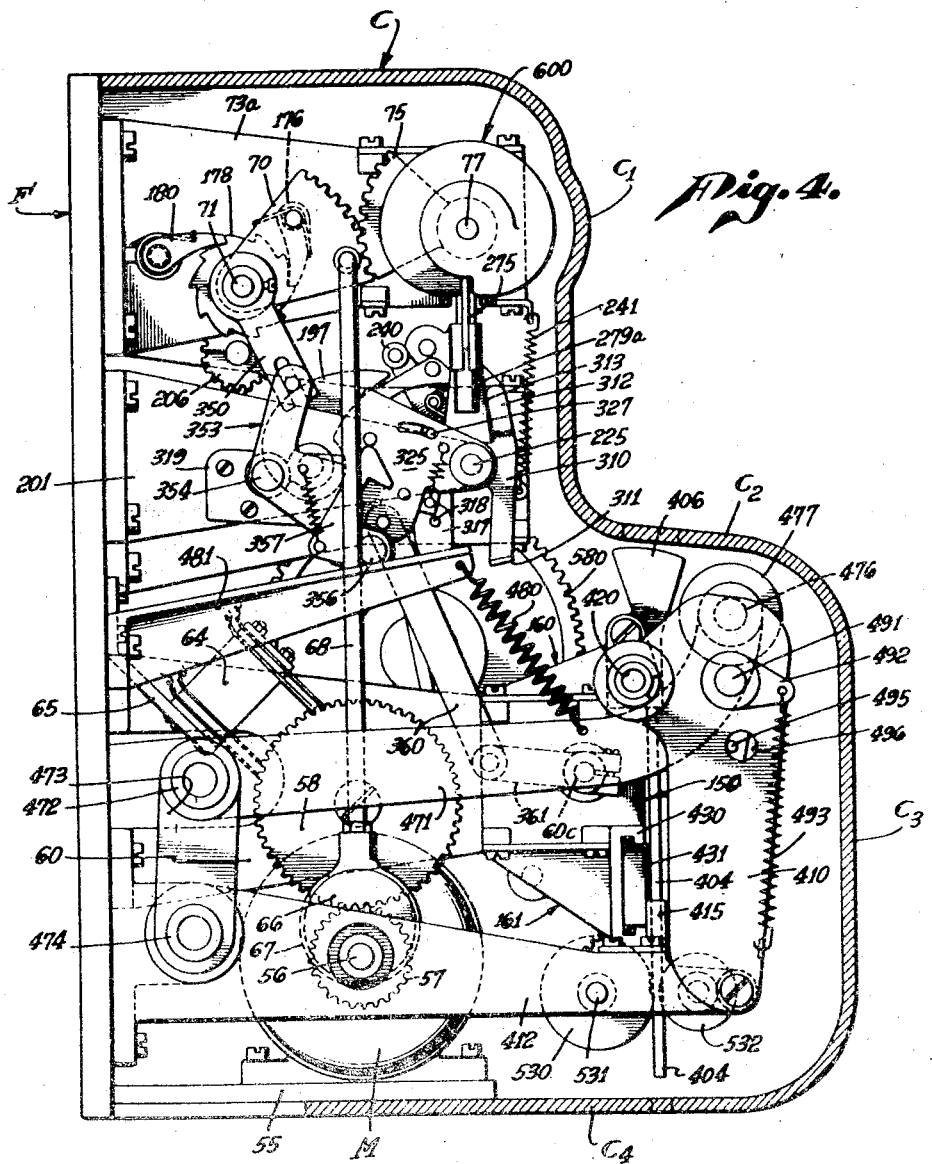
Fig. 4 is a side elevation of the meter recorder, being a view taken as indicated by broken line 4—4 of Fig. 3.

The previously mentioned electric motor M is here shown as mounted in the bottom of casing C (Fig. 7), as for example on a bracket 55 projecting from panel F near the lower edge of the latter. The shaft 56 of motor M carries a spur gear 57, which meshes with a spur gear 58, of twice the diameter as gear 57 (Figs. 4 and 7). Gear 58 is supported for rotation in any suitable manner, as for instance by means of a stub shaft 59 (Fig. 7) suitably journaled in a bearing, not shown, carried by a bracket 60 projecting from frame panel F. The cam 40 is secured to one face of this gear 58. The switches S₃ and S₄ are carried by an insulation block 64 mounted on a bracket 65 projecting from panel F. Motor shaft 56 also carries, outside of gear 57, an eccentric 66 around which is an eccentric strap 67 to which is connected a push rod 68.

Gear 58 being twice the diameter of gear 57, the motor shaft and gear 57, as well as eccentric 66, make one complete revolution for each half revolution of gear 58 and cam 40. The relations are made such that when cam shoulder 42 passes and opens either switch S₃ or S₄, thereby arresting the rotation of motor M, eccentric 66 and push rod 68 are at the top of their stroke, as in Fig. 7. It will be evident, therefore, that for each tenth kilowatt hour of electrical energy consumed, push rod 68 will travel through one complete down and up reciprocation.

*Visible kilowatt hour register*

The upper end of push rod 68 is pivotally connected to a gear segment 70 pivotally mounted on one end portion of a horizontal shaft 71 which is rotatably supported in bearings 72 formed on a pair of brackets 73a and 73b projecting from panel F (see Fig. 10). Gear segment 70 meshes with and reciprocates a gear segment 75 which is keyed to a sleeve 76 (Fig. 10) mounted for free rotation on a horzontal shaft 77 extending through the outer end portions of the aforementioned brackets 73a and 73b, sleeve 76 being provided with bearing in the outer end portion of bracket 73a, as clearly appears in Fig. 10.

Welded or otherwise joined to sleeve 76 immediately inside bracket 73a, is one arm 79 of a yoke 80, said arm 79 being rotatable on shaft 77, and the other arm 81 of the yoke likewise being rotatable on shaft 77 at a point immediately inside the other bracket 73b (Figs. 10 and 13). This yoke 80 thus makes a rotative reciprocation (down and up) on shaft 77 with each reciprocation of push rod 68, being so operated by the meshing gear segments 70 and 75.

Mounted between the arms 79 and 81 of yoke 80 is what I may term a multiple pawl 85, the latter comprising a bar 86 having pawl teeth 87, 88, 89, 90 and 91 mounted thereon at graduated angles or angular positions, the teeth and bar comprising an integral structure (Figs. 10 and 11. The angular separation of the pawl teeth is such that but one is operative to drive the later-described counter wheels at a time, as will appear. The end portions of bar 86 are pivotally mounted in yoke arms 79 and 81, in the manner indicated in Fig. 10.

These pawls are longitudinally spaced on the bar 80 so that they engage toothed discs 93, 94, 95, 96 and 97 which are riveted or otherwise secured to respective counter wheels 93', 94', 95', 96' and 97' of a visible kilowatt hour register or counter 98, said wheels being rotatably mounted and longitudinally spaced on the aforementioned shaft 77 (Figs. 10 to 13). Each digital counter wheel contains circumferentially spaced numerals from 0 to 9, and each toothed disc has a tooth 100 corresponding to each numeral. Each toothed disc has, between two of the teeth 100, a relatively deep notch 101 adapted to receive the corresponding pawl tooth, for a purpose and in a manner presently to appear.

As mentioned above, the counter wheels are independently mounted for free rotation on the shaft 77, which is stationary excepting during resetting, and rotation of the counter wheels in a direction reverse to that imparted by the pawl teeth is prevented by a spring actuated detent 102 engageable with successive teeth 100, as seen best in Figs. 11 and 12. A coil spring 104 wound around bar 86 of multiple pawl 85 is anchored at one end to the yoke and the other end to one of the pawls, as 87 (see Fig. 11), and serves to urge the multiple pawl into engagement with the toothed discs.

Figure 3:
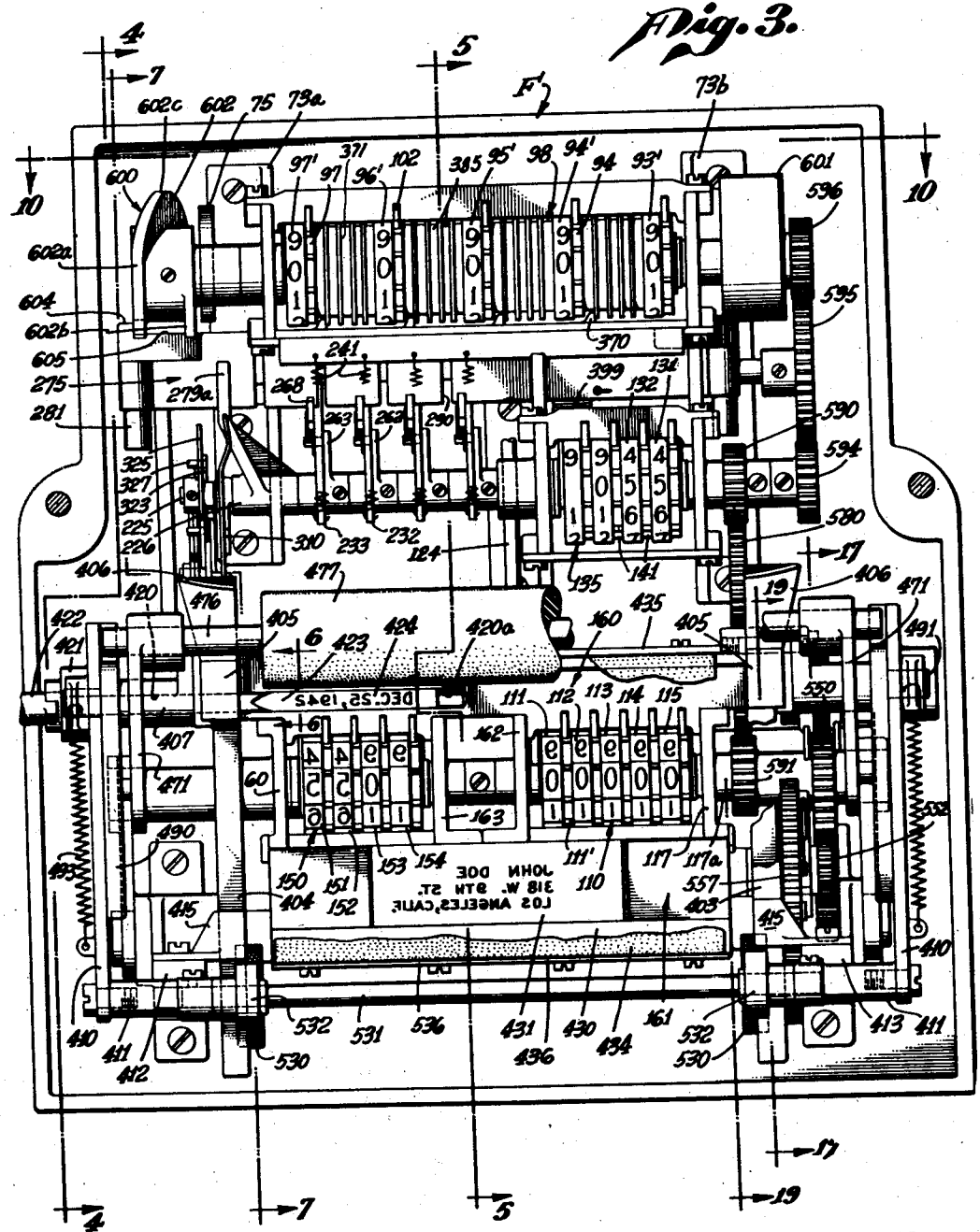
Fig. 3 is a front elevation of the meter recorder with the front cover removed, and with some parts broken away, to reveal underlying mechanism.

Assuming all the counter wheels to be set to read "0," as in Fig. 3, the first reciprocation of yoke 80 brings first pawl tooth 87 into engagement with the nearest tooth 100 on first toothed disc 93, moving first counter wheel 93' in the direction of the arrow in Fig. 11 through a distance corresponding to the spacing of the teeth 100, and thereby moving numeral 1 into position before the window 50. The counter starting at 0, the toothed discs 93 will initially be in the position of Fig. 11, with the pawl teeth ready to engage the first tooth 100 in back of notch 101. Successive energizations of motor M through the means described then cause successive actuations of toothed disc 93 and counter wheel 93' by pawl tooth 87, causing succeeding numbers on the counter wheel 93' to be moved up into position until the numeral 9 is passed, whereupon pawl tooth 87 drops into V-shaped notch 101 in disc 93, the whole multiple pawl structure swinging closer to the counter wheels. Thereupon second pawl tooth 88 engages the toothed disc 94 associated with second counter wheel 94'. On the next reciprocation of yoke 80, first toothed disc 93 will again be advanced, pawl tooth 87 acting thereon within the notch 101, while at the same time, second pawl 88 engages the first tooth 100 of second toothed disc 94 and advances the latter and its counter wheel 94' one step. First toothed disc 93 and associated counter wheel 93' are then back in the zero position of Fig. 11, while second toothed disc 94 and its counterwheel 94' have been advanced so that numeral 1 is now in position. In other words, the counter now registers 00010. The multiple pawl 85 is also back in the position of Fig. 11. It will thus be evident that each time first counter wheel 93' moves from the 9 position to the 0 position, second counter wheel 94' is advanced one step. And it will be further evident that as second counter wheel 94' is finally advanced from the 9 position to 0 position, the second pawl 88 will at such time be working within the notch 101 in second toothed disc 94, permitting third pawl 89 to engage the toothed disc associated with the third counter wheel, thus advancing the latter one step. Fig. 12 shows a typical position in which the first four pawls have dropped within the respective V-notches, bringing fifth pawl 91 into position to engage fifth toothed disc 97. Thus each time each counter wheel moves through the last step to complete a revolution and comes back to zero, the next counter wheel in the series is advanced one step. Operation of the counter is thus progressive in multiple counts of ten.

Since each energization of motor M effecting a reciprocation of yoke 80 corresponds with consumption of one-tenth of a kilowatt hour, counter wheel 93' registers tenths of a kilowatt hour, counter wheel 94' registers unit kilowatt hours, counter wheel 95' registers tens of kilowatt hours, and so on. Thus the total capacity of the counter is 9,999.9 kilowatt hours.

*Printing kilowatt hour counter*

The printing kilowatt hour counter designated generally by numeral 110 (see Fig. 3), embodies a series of type wheels 111, 112, 113, 114 and 115, corresponding respectively to visible counterwheels 93', 94', et seq., rotatably supported on a rotatable horizontal shaft 116 (see also Figs. 5, 22 and 23), arranged in the lower portion of casing C, somewhat forwardly of visible counter wheel shaft 77. The type counter wheels 11, 112, et seq., are arranged on their shaft 116 in reversed order from the corresponding counter wheels 93', 94', et seq., and the numerals thereon are reversed right for left, as is required for printing. Further, the type wheel 111 at the left end of the series is provided with decimal points which will print to the left of the numerals of that wheel. The shaft 116 is journalled near one end in a sleeve 60a (Fig. 22), which is in turn rotatably supported in a bearing 60b formed on the outer end of the aforementioned bracket 60, and near its other end, shaft 116 is journalled in a bearing 117a formed on the outer end of a bracket 117 extending from frame panel F. Integral with sleeve 60a and projecting outwardly therefrom is a stub shaft 60c (Fig. 22) by which said sleeve may be rotated to reciprocate a later described counter actuating yoke.

The type wheels 111, 112, etc., have secured to their sides toothed disc 111', 112', etc., similar to the toothed discs 93, 94, etc., associated with the visible counter wheels. As appears in Fig. 3, the printing kilowatt hour wheels 111, 112, etc., are arranged in closely spaced relation on the right hand end portion of the shaft 116, just inside the bracket 117, a later described price printing counter being positioned on the left hand portion of said shaft.

Printing kilowatt hour counter 110 is operated by a yoke 120 (Figs. 5 and 22) similar to the yoke 80 of the visible counter, and which has yoke arms surrounding the shaft 116 at the two ends of the counter 110, as will be understood. This yoke 120 will be understood to carry a multiple pawl 121 (Fig. 22), understood to be similar to the multiple pawl 85 carried by the yoke 80 in all respects, excepting that the order of the pawl teeth is reversed to correspond with the right for left reversal of the printing type wheels.

A link 124 is pivotally connected at its upper and lower ends to extensions 125 and 126 from yokes 80 and 12, respectively, and causes the printing kilowatt hour counter to be actuated simultaneously with the actuation of the visible kilowatt hour register, it being of course understood that the printing kilowatt hour counter 110 is operated by the yoke 120 in a manner exactly analogous to the operation of the visible kilowatt hour counter wheels by the yoke 80.

It will thus be seen that the visible kilowatt hour register is actuated by intermittent energization of the motor M through gear segments 70 and 75 in cooperation with yoke 80, multiple pawl 85, and toothed discs 93, et seq., and visibly registers current consumption in terms of kilowatt hours and tenths, while through link 124 a similar mechanism embodying printing type wheels containing type numerals corresponding to the visible numerals of the visible counter is simultaneously operated to register the identical information in the form of type presented in a common plane for printing operations.

*Visible and printing price counters*

Rotatably mounted on a horizontal shaft 130, located below and parallel to visible kilowatt hour counter wheel shaft 77, are the counter wheels 131, 132, 133 and 134 of a visible price or value counter or register 135 (Figs. 3 and 13). The shaft 130 for this counter or register 135 is journalled near one end in a bearing 136 formed in a bracket 137 extending from panel F, and is journalled at its other end within a sleeve 138 which is in turn journalled in a bearing 139 formed on a second bracket 140 extending from panel F, all as clearly appearing in Figs. 13 and 14. Secured to the sides of counter wheels 130 to 133 are toothed discs 141, which are identical in design and function to the toothed discs 93, et seq., and which will be understood to be operated by a yoke and multiple pawl assembly, fragmentarily appearing at 142 in Fig. 13, and understood to be similar in design and function to the yoke 80 and multiple pawl 85. These parts having been already detailed in Figs. 11 and 12, no further illustration thereof is deemed necessary. The two arms 143 and 144 of this actuating yoke 142 are indicated in Fig. 13 as surrounding the shaft 130 at the two ends of the counter 135, the arm 143 being secured, as by welding, to the end of the sleeve 138 previously described as rotatably mounted in bearing 139.

On the left hand portion of shaft 116, immediately to the right of bracket 60, as viewed in Figs. 3 and 22, is a printing price counter 150, comprising a series of type wheels 151, 152, 153, and 154, each provided with a toothed disc 155, like the toothed disc 93, et seq., of the visible kilowatt hour counter previously described. Without going into particular detail in the description of the printing price counter 150, it will suffice to note that the printing price counter 150 bears the same structural and functional relationships to the visible price counter 135 that the kilowatt hour printing register 110 bears to the visible kilowatt hour register, and is operated through the medium of a yoke 156 and multiple pawl 157 (Figs. 22 and 23) similar to the yoke and multiple pawl of the printing kilowatt hour counter 110. One arm of the yoke 156 is secured to the sleeve 60a, and the yoke is reciprocated by rotation of the stub shaft 60c integral with said sleeve.

Mounted on the top and on the bottom of the forward end portions of brackets 60 and 117 and extending horizontally therebetween are frame members 160 and 161, respectively, and secured to and extending vertically between the latter, at the inner or adjacent ends of the two printing counters 110 and 150, are vertical walls 162 and 163, respectively, carrying intermediate bearings 164 and 165 for shaft 116.

*Rate changing mechanism*

Actuation of the visible price register or counter 135 and of the printing price counter 150 is derived from the same impulses which actuate the visible kilowatt hour register, and takes place through a computing mechanism which automatically varies the rate of charge at predetermined totals of electrical energy consumed.

The aforementioned gear segment 70 reciprocated by push rod 68 carries a pin 175 on which is pivoted a pawl 176, and a spring 177 urges this pawl into engagement with the teeth of a ratchet wheel 178 secured to the shaft 71 as by set screw 179 (Figs. 7 and 10) so that rotation of ratchet wheel 178 imparts rotation to shaft 71, it being recalled that gear segment 70 is rotatable on said shaft. A spring actuated detent 180 engages the teeth of ratchet wheel 178 to prevent reverse rotation. There are ten teeth on the ratchet wheel, and each energization of motor M, and consequent down-and-up reciprocation of push rod 68, moves ratchet wheel 178 one tooth or one-tenth of a revolution. The actual travel of the pawl 176 is made preferably slightly more than one-tenth of a revolution in order to assure proper cooperation with the ratchet wheel. The shaft 71 is thus rotated one-tenth of a revolution for each tenth of a kilowatt hour consumed, and accordingly completes one revolution for each kilowatt hour. Driven from this common shaft 71 is a plurality of rotatable actuating elements for the price counters 135 and 150, said elements being, for instance, in the form of cams of differential frequency; for instance, they may be driven at different rates of rotation. Selector mechanism is provided whereby these actuating elements are selected in succession, one at a time, and rendered effective to actuate the counters 135 and 150. The operation of the selector mechanism is preferably under the control of the visible kilowatt hour counter. It should here be mentioned, however, that in fulfilling this control function, the kilowatt hour counter need not necessarily be of a type from which the kilowatts consumed may be read or printed. It is sufficient, in this aspect of the invention, if said counter merely travels proportionately to kilowatt hours consumed, and be adapted for performance of the control function to be described. The price counter actuating mechanism and selector mechanism will now be described in more detail.

On shaft 71 is secured a plurality of gears 190, 191, 192, and 193 (Fig. 10), of progressively decreasing diameters, which operate through presently described gear trains of different driving ratios to impart simultaneous but differential rotation to respective cams 194, 195, 196 and 197 (Figs. 5 and 14), mounted for free rotation on a fixed horizontal shaft 200.

The shaft 200 is supported in the aforementioned frame brackets 137 and 140 and in a third frame bracket 201 spaced horizontally from bracket 140 (Fig. 14). Rigidly attached to each cam, and rotatable on the shaft 200 with the cam, is a spur gear 205, the gears 205 being in alignment with respective gears 190 to 193 on shaft 71. The gears 190 to 193 drive the respective cam gears 205 through gear trains comprising pairs of idler gears 206 and 207 rotatably mounted on carrying arms 208 clamped to the fixed shaft 200, the idlers 206 meshing with the drive gears on shaft 71, and the idlers 207 meshing with the cam gears 205, all as will be readily understood from an inspection of Figs. 5, 10 and 14.

The gear ratios of the cam driving gear trains are so fixed that each cam makes one revolution for each one-cent's worth of electrical energy consumed at the various charge rates to be put in effect. Thus the gear train 190, 206, 207 and 205 imparts 4.4 revolutions to the cam 194 for every ten reciprocations of the actuating push rod 124. In other words, cam 194 rotates through 4.4 revolutions for each kilowatt hour of electrical energy consumed, 4.4 revolutions of the cam 94 corresponding with a charge of 4.4 cents, in accordance with the maximum domestic charge rate assumed. Gear train 191, 206, 207 and 205 drives cam 195 at a rate of 2.2 revolutions for each ten reciprocations of the actuating push rod 124, or one kilowatt hour. Gear train 192, 206, 207 and 205 drives cam 196 at a rate of 1.5 revolutions for each kilowatt hour consumed, and gear train 193, 206, 207 and 205 drives cam 197 at a rate of 1.25 revolutions for each kilowatt hour consumed. The last three rates accord with typical decreasing domestic rates applicable to increased current consumption. The typical rates assumed are as follows: The first thirty-five kilowatts at $.044 per kilowatt hour; the next sixty-five kilowatts at $.022; the next one hundred at $.015; and all in excess at $.0125. It may be mentioned at this point that the machine may readily be changed to accord with different rates simply by changing the gears 190 to 193 and idlers working therewith.

Thus all of the cams 194 to 197 are intermittently rotated, simultaneously, but at different rates of speed. Only one cam at a time, however, is effective in causing operation of the visible and printing price counters. The means by which the several cams are selectively rendered effective to accomplish operation of the price counters will next be described.

A horizontal shaft 225 arranged coaxially with visible price counter shaft 130 (Fig. 13) is received at one end within the sleeve 138 heretofore described as journaled in bearing 139, and said shaft 225 is journaled at its other end in a bearing 226 formed at the forward end of the aforementioned bracket 201. The end of the shaft 225 received within sleeve 138 carries a transverse pin 227 which engages in a slot 228 in sleeve 138. It being recalled that sleeve 138 is joined to the multiple pawl carrying yoke 142 of the visible price counter, it will be evident that oscillation of the shaft 225 will effect operation of said counter.

Rotatable on shaft 225, and extending from bearing 139 to bearing 226, is a sleeve 225a, and mounted for independent free rotation on sleeve 225a is a series of cam actuated levers 230, 231, 232 and 233, one for each of the cams 194, et seq. These levers are identical, and a description of one will suffice. The lever carries at its upper end a cam follower roller 240 adapted to engage the edge of the associated cam. A spring 241 secured to a tail piece 242 projecting from the hub of the lever urges the follower roller 240 into engagement with the cam. Pivotally mounted on the lever, as at 243, is a double armed pawl 245, which is yieldingly urged in a counterclockwise direction as seen in Figs. 4 and 5 by means of a spring 246, as clearly indicated in Fig. 5.

Also mounted on the sleeve 225a, but tightly secured thereon, is a series of cranks 260, 261, 262 and 263, one for and adjacent to each of the levers 230, et seq. Reciprocation of any of these cranks will cause corresponding oscillation of the sleeve 225a.

Figure 5:
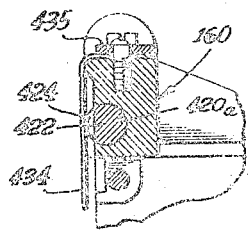
Fig. 5 is a section taken on line 5—5 of Fig. 3, certain parts being broken away.

As will be clear from an inspection of Figs. 5 and 13, the crank associated with each of the levers is on one side of the lever, while the two-armed pawl 245 carried by said lever is on the other side thereof; also as clearly shown in said figures, the end portion of the crank carries a pin 265 which projects under the lever and is adapted to be engaged and moved by the lower edge of the lever, and is also adapted to be engaged and held against the lever by the pawl 266 forming one arm of the two-armed pawl 245. The pawl arm 266 being so engaged with the crank pin 265, the crank, and therefore the sleeve 225a to which the crank is secured, are oscillated with the movement of the lever as its cam follower roller 240 is actuated by the associated cam. This oscillation of the sleeve 225a is translated into operation of the visible price counter 135 in a manner to be presently described.

Normally, the lever 230 is latched by the other arm 268 of the two-armed pawl 245 in a position (see Fig. 7) in which its cam follower roller 240 is out of the path of the associated cam, the other arm 266 of the two-armed pawl being at such time out of engagement with crank pin 265.

The means on which the pawl arms 268 are latched to hold the levers 230, et seq., out of operative engagement with their respective cams comprises a two-part horizontally shiftable rate changing device 275 embodying a channel-shaped bar 276 and a flat plate or blade 277 received and vertically movable in the channel 278 of said bar, the channel 278 opening through the upper edge of bar 276, as illustrated in Figs. 13 and 13a. The channel-shaped bar 276 and blade 277 move longitudinally as a unit in guides 279a and 279b for a purpose and in a manner hereinafter explained, and the blade is urged vertically away from the bar 276 by coil springs 280 confined in spring barrels 281 secured to opposite ends of bar 276. The lower edge of the bar 276 is wedge-shaped, as appears in Figs. 5 and 13a, and the angular surface 283 so provided is adapted to be engaged by the end 284 of the pawl arm 268 as said pawl arm is moved against it, in such a manner as to depress the pawl arm against its spring 246 and thus permit the pawl arm to move under and engage in back of the bar 276 (see the dotted line and full line positions of the pawl in Fig. 13b).

The lower edge portion of bar 276 is formed with a plurality of slots or notches 290, 291, 292 and 293, spaced and adapted, upon horizontal movement of the bar 276 in the direction of the arrow in Fig. 13, to register successively with the several pawl arms 268. In the movement of the bar 276 from left to right (position of Fig. 3 to position of Fig. 13), the right hand pawl 268 registers first with the notch 290, the second pawl 268 registers next with the notch 291, and so on. Fig. 3 shows the beginning position, immediately after resetting, in which first notch 290 is still to the left of first pawl arm 268. It will be evident that as each notch 290, 291, etc., registers with the corresponding pawl arm 268, said pawl arm becomes released from the bar 276, and is permitted to pass through the notch, the lever carrying the pawl at the same time advancing under the influence of its spring 241 to bring its cam follower roller 240 into operative association with the corresponding cam.

The lower edge of blade 277 has, in line with the notches 290, 291, etc., downwardly extending and outwardly displaced lugs 296 (see Fig. 5), the outer faces of which are precisely flush with the outer face of bar 276. The lower edges of these lugs normally, that is, when the blade is in its uppermost position, clear the path of the pawl arms 268, but when the blade is depressed in the channel in bar 276, in a manner later to be described (see Fig. 13b), these lugs close the notches in the bar. As here shown, the lugs 296 are provided at the back with lugs 297, which serve to fill the lower portions of the notches to the rear of the lugs 296 when the blade is depressed, and which also, together with the lugs 296, serve to lock the blade and bar 276 against relative longitudinal displacement (Fig. 13b).

As stated above, the beginning position of the bar 276 and the blade 277 is as shown in Fig. 3, and it will be observed that the several notches 290, 291, etc. are displaced by progressively increased distances to the left of the corresponding pawl arms 268. And in such position, all of said pawl arms are latched on the bar 276, so that the levers 230, 231, etc., carrying the pawl arms 268 are all supported with their cam follower rollers 240 out of the paths of the cams, as in Figs. 4 and 14. Under the control of means subsequently to be described, the bar 276 and blade 277 are shifted at predetermined totals of electrical energy consumed to bring the notches 290, 291, etc., into successive register with the several pawls 268, whereby said pawls are released one at a time by said bar and travel through the notches to permit the corresponding cam lever to bring its cam follower roller 240 into operative association with the corresponding cam.

The several cams 194, 195, 196 and 197 are all of the same shape, and a description of the cam 194 appearing in Fig. 5 will suffice for all. As will be seen in Fig. 5, the cam has a portion 301 of rapidly increasing radius, and a substantially radial drop-off portion 302 extending inwardly from the maximum radius end of cam portion 301. The cam rotates in the direction of the arrow in Fig. 5, and it will be evident that when the cam 194 has rotated a short distance beyond the position shown in Fig. 5, the follower roller 240 will descend along cam portion 302, the spring actuated lever 230 rocking downwardly, as to the position shown in Fig. 5a. For a reason which will appear hereinafter, it is generally desirable that the cam be so shaped as to elevate the lever 230 rather rapidly, particularly during the latter portion of upward travel. For this reason, the cam portion 301 is preferably made relatively steep toward its end.

As previously stated, when the pawl arm 268 is released from bar 276 by reason of notch 290 registering therewith, the spring 246 acts to cause pawl arm 266 to engage the pin 265 on crank 260. Said crank is thereby locked to lever 230, and hence oscillates with the cam-controlled oscillation of the lever. The sleeve 225a on which the cranks are tightly mounted oscillates correspondingly.

Just outside bearing 226, sleeve 225a carries a depending arm 310, tightly secured on the sleeve, and formed at its lower end with an outwardly bent lug 311. Extending upwardly from arm 310 is a stop arm 312, adapted to engage against a stop conveniently afforded by the side of the guide member 279a. Such engagement limits downward movement of the crank arms, and therefore of the cam levers, to the position indicated in Fig. 5a. Thus, the cam 194 having rotated from the position shown in Fig. 5 to such a position as shown in Fig. 5a, the lever 230 and crank 260 will have dropped to the position of Fig. 5a, such position being established by engagement of stop arm 312 with stop 313. As cam 194 then continues to rotate, it will eventually pick up follower roller 240 and elevate the lever 230 and crank arm 260 back toward the position of Fig. 5. During such elevational travel of crank arm 260, arm 310 on crank arm sleeve 225a moves toward the position illustrated in Fig. 8, finally engaging a lug 315 on the tip of the lower arm 316 of a trip lever 317 pivotally mounted at 318 on a bracket 319 secured to the side of and spaced from bracket 201.

The upper arm 320 of trip lever 317 has an outwardly bent lug 321 whose lower edge normally engages over the end portion of arm 322 of bell crank 323 (Fig. 7), the latter being pivotally mounted at 324 on the inner face of an oscillating plate 325 which is tightly mounted on the extremity of shaft 225. The other arm 326 of bell crank 324 carries a pin 327 which projects through an arcuate slot 328 in plate 325. Bell crank 323 is normally urged to the relative position shown in Fig. 8 by means of a spring 330 connected between it and the plate 325, its pin 327 at such time being at the left-hand end of slot 328, as viewed in the aspect of Figs. 7 and 8. In the position of Fig. 7, the bell crank 323 is being held, against the influence of spring 330, in position with its pin 327 at the other or right hand end of slot 328 by the lug 321 of trip lever 317, which lug at such time overrides the arm 322 of bell crank and holds the latter in such position against its spring 330.

The upper arm 320 of trip lever 317 has a pin 335 which projects through an arcuate slot 336 in bracket 319, and a coil spring 337 connected between said pin 335 and bracket 319 yieldingly urges the trip lever toward the position illustrated in Figs. 7 and 9a, with the pin 335 located against the left-hand end of the slot 336.

The previously described movement of the arm 310 in the direction of the arrows in Figs. 7 and 8 results finally in engagement of trip lever 317 by said arm, and movement of the trip lever from the position of Fig. 7 to the position of Fig. 8, in which trip lever lug 321 has cleared bell crank arm 322, and the latter, under the influence of its spring 330, then moves to the position shown in Fig. 8.

Tightly mounted on shaft 71 oscillated by gear sector 70 and normally extending downwardly and somewhat forwardly from said shaft, is a bifurcated arm 350, which receives a pin 351 set in the end of the upper arm 352 of a bell crank 353 pivotally mounted at 354 on bracket 319.

The other arm 355 of bell crank 353 has pivotally mounted thereon, as at 356, a hook member 357, and said hook member carries a pin 358 which projects under arm 355 so as to engage the latter and thereby serve as a stop against clockwise rotation of the hook member relative to the bell crank beyond the position shown in Fig. 7. A spring 359 connected between said pin 358 and arm 355 holds the hook member yieldingly in the position of Fig. 7 with the pin 358 in engagement with the underside of arm 355, as described.

Fig. 7 shows the normal position of the last-described parts. Upon each energization of the motor M, rod 68 reciprocates the gear sector 70, arm 350 and hook-carrying bell crank 353 between the two extreme positions shown in Figs. 7 and 8. The hook 357 is so positioned that in the course of this action it clears the pin 327 projecting from bell crank 323 if the bell crank remains in the position of Fig. 7. However, if trip lever 317 has previously been moved, so as to release bell crank 323, and the latter has accordingly moved to the position shown in Fig. 8, then said pin 327 is in the path of the hook member and will be engaged thereby. On the upstroke of the hook member under such conditions (downstroke of push rod and gear sector 70), the hook member may engage pin 327 at its sloping end portion 364, but will be moved somewhat in a counterclockwise direction, against spring 359, to permit pin 327 to be passed. Then, on the return or downstroke of the hook member (upstroke of rod 68 and gear sector 70), hook member 357 engages pin 327, and moves said pin, together with oscillatory plate 325, in a downward direction to the position shown in Fig. 9. This movement of plate 325 rocks shaft 225 on which said plate is tightly mounted, and, it being recalled that the multiple-pawl carrying yoke for the visible price counter 135 is directly operated by shaft 225, results in one actuation of said counter. Plate 325 is connected by a link 360 to an arm 361 tightly mounted on the shaft 60c which operates the yoke 156 carrying the multiple pawl for the printing price counter 150. Thus the printing price counter is actuated simultaneously with the actuation of the visible price counter.

The parts then remain in the position of Fig. 9 until the next energization of motor M, at which time gear sector 70 is again lowered and bell crank 353 rocked in a counterclockwise direction back toward its position as shown in Fig. 8. During this movement of bell crank 353, the lower arm 355 thereof engages a pin 362 projecting from plate 325 and so elevates the latter back to the position of Fig. 7. In the course of this action, arm 322 of bell crank 323 engages lug 321 of trip lever 317, and is caused thereby to swing relatively to plate 325 to the position shown in Fig. 7. On the return or upstroke of gear segment 70, bell crank 353 is then rocked back to the position of Fig. 7, its hook member 357 clearing pin 327 carried by bell crank 323 since said pin is now at the right hand end of its slot 328, it being understood that the bell crank 323 is now again held in the position of Fig. 7 by trip lever 317.

Thus, assuming bar 276 to have been shifted to position with one of its notches 290, 291, etc., to a position of register with the corresponding pawl arm 268, so that the said pawl arm has released the corresponding pawl carrying lever to move into operative association with the corresponding cam, and also so that the pawl arm 266 becomes locked through pin 265 to the corresponding crank 260, 261, etc., periodic energization of motor M, and the accompanying oscillation of gear segment 70 and of bell crank 353, has no effect insofar as operation of the visible and printing price counters is concerned until the cam has lifted the lever and crank associated therewith sufficiently to cause arm 310 to trip lever 317. The next energization of motor M, however, results in the hook member 357 carried by bell crank 353 engaging the pin 327 and so rocking plate 325 in a downward direction, thereby effecting a registering stroke of the counter operating devices. The next succeeding energization of motor M then returns the oscillating plate 325 to its original position, and resets the pin-carrying bell crank 323 and trip lever 317. By this time, the tip, or maximum radius portion, of the actuating cam has passed the follower roller 240 carried by the associated lever, and the latter, together with the corresponding crank, have been moved by spring 241 back down to a position in which the arm 310 is retracted to the position indicated in 5a. Further energizations of the motor M then result in further progressive rotation of the cam, but without actuation of the plate 325 to register another unit on the counters until the cam has again elevated the follower roller and lever, together with the associated crank, sufficiently to bring about another actuation of trip lever 317 and release of bell crank 323.

It will be observed that while the several cams 194, et. seq., function as the actuating elements for the price counters, acting in cooperation with the released cam levers and associated parts to bring about operation of the price counters, the actual power for moving the price counters is in the above described embodiment of the invention derived not from the train of cams but from the reciprocating parts 68, 70, 350, 353, and 357 driven directly from motor M. Thus while the cams actuate the price counters in the sense of causing their operation by the prime mover (motor M), the power for moving the counters is not transmitted through the cams. In later indicated modifications, the cams may not only actuate the counters but drive them as well, or the counters may be advanced by spring action, and moved through their return stroke by the cams.

It will be evident that the number of energizations of motor M necessary to cause each such described actuation of the price counters depends upon the rate of angular rotation imparted to the particular cam corresponding to the particular pawl arm 268, which has been released by registration therewith of a notch in bar 276. And the rates of angular rotation imparted to the different cams being all different, it will thus be evident that the price registered on the counters will be governed by which of the notches 290, 291, 292, and 293 in the bar 276 has been registered with a pawl arm 268.

In accordance with the invention, the bar 276 is periodically shifted under the control of the visible kilowatt hour register or counter. As seen best in Fig. 13, the upper edge of the blade 277 of rate changing device 275 is formed with a plurality of longitudinally spaced lugs 370, which are adapted to perform a functional cooperation with sets of uniformly spaced selector flanges 371 mounted between the counter wheels of the visible kilowatt hour register in a manner now to be described. On the shaft 77 of the visible kilowatt hour counter or register, which will be recalled to support for free rotation the counter wheel 95' and toothed disc 95 (Figs. 13, 15 and 16) as well as their counter parts in the series, is rotatably mounted a series of hubs 372, one immediately to the left of each of the counter wheels, except the last counter wheel, as clearly appears in Fig. 13.

Figure 15:
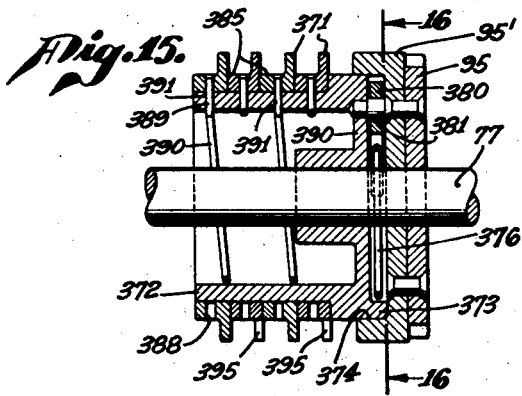
Fig. 15 is a detail section taken in accordance with line 15—15 of Fig. 13.
Figure 16:
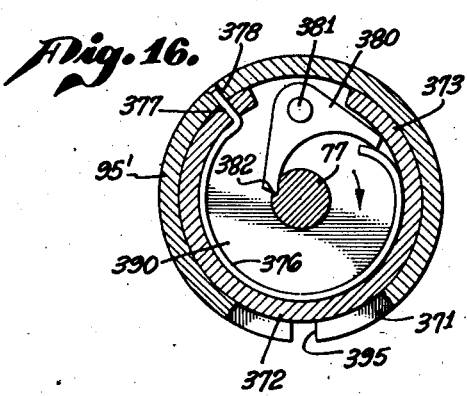
Fig. 16 is a cross-section taken on line 16—16 of Fig. 15.

As best seen in Figs. 15 and 16, the right hand end portions of these hubs, including circumferential end flanges 373 formed on the hubs, are received for free rotation in annular recesses 374 sunk in the sides of the adjacent counter wheels. Each hub is rotatably driven by the associated counter wheel, as 95', through the medium of a spring 376, the tail of which projects through a hole 377 in the hub and a registering hole 378 in the counter wheel. The opposite end of said spring depresses a pawl 380 pivoted on a pin 381 set into the end wall or web 390 of hub 372, causing the wedge-shaped end portion of one arm of the pawl to seat in an angular notch 382 of shaft 77. The purpose of this pawl will appear hereinafter in connection with a description of the resetting mechanism.

On each hub 372 is positioned a series of rings 385 on which are formed the aforementioned annular flanges 371, there being one such ring and flange corresponding to each of the notches 290, 291, et seq., in rate-changing bar 276. The rings 385 are freely rotatable on hub 372 for adjustment purposes, and are positioned thereon in end to end engagement, as illustrated. Each ring 385 is provided with a series of ten equally spaced holes 388, and is secured in adjusted position upon the hub 372 for rotation therewith by the tail 389 of a circular spring 390, which is arranged so that the same spring will lock two of the rings to the hub in selected adjusted positions by inserting the two ends or tails of each spring through holes 391 in the hub and into selected holes 388 in the ring.

Each ring flange 371 is formed with a notch 395, the circumferential position of which with reference to hub 372 is adjustably determined by the spring-locking mechanism last described. These notches 395 are of sufficient width to pass the lugs 370 on the blade 277 of the rate changing device when registered therewith. For the purpose of all but the right hand set of flanges 371, i. e., those associated with the right hand counterwheel 93', these notches may be relatively narrow (see Fig. 16), being of just sufficient width to pass the rate changing blade easily, or with relatively small working clearance. For the purpose of the right hand set of flanges, associated with the right hand or tenths counterwheel 93', it is desirable for a reason that will later appear that some of these notches be of somewhat increased widths. For instance, the notch in the flange 371 furthest to the left from the counterwheel 93' may have a relatively narrow notch of the type shown in Fig. 16, for instance, of an angle of about 12°; the next flange toward the right may have an approximately 48° notch; the next flange may have an approximately 84° notch; and the remaining flange may have an approximately 120° notch. It is to be understood that these increases in the widths of the second, third and fourth flange notches associated with the first counterwheel 93' are on the back sides of the notches; that is to say, the widening is done in a direction extending backwardly with respect to the direction of rotation, so that any given one of such widened notches will register with the rate bar lugs 370 simultaneously with the narrow notches in the corresponding flanges associated with the remaining counterwheels, but will then remain registered therewith while the counterwheel 93' is stepped one or more times ahead.

At the beginning of operation, the lugs 370 on blade 277 engage the left hand faces of the left hand flanges 371 of the four sets of such flanges, as appears in Fig. 3. At a predetermined point in the operation of the counter, the notches 395 in the four left-hand flanges of the four sets of flanges come into alignment, whereupon the lugs 370 are permitted to enter and pass through said notches, and the blade 277 thus being freed of interference from the flanges, the blade and bar 276 are shifted toward the right, or in the direction of the arrow in Fig. 13, by a spring 399 connected between bar 276 and the frame structure of the recorder. The travel of the blade 277 as described, is, however, only the distance from the face of the first flanges 371 to the corresponding faces of the second flanges 371, since the notches 395 in the second flanges will not then be in alignment with one another and with the lugs 370, and the lugs 370 will accordingly engage the second flanges 371. This travel of blade 277 and bar 276 registers first notch 290 with first pawl arm 268, thus releasing the latter and putting the first cam 194 into operative effect. At predetermined points in the subsequent operation of the counter, the notches in the second, third and fourth flanges come successively into register, causing movements of the blade 277 and bar 276 such as bring the bar notches 291, 292, and 293 into register with their corresponding pawl arms 268, and thus putting the second, third and fourth cams into successive operative effect.

In accordance with the preferred form of the invention, there is provided certain reset mechanism, hereinafter described, which resets the visible and printing price counters to a minimum price of $.55 at the time the kilowatt hour counters are reset to zero kilowatt hours. Accordingly, it becomes necessary that the price-registering mechanism remain inactive until a quantity of electrical energy corresponding to a charge of $.55 has been consumed, this quantity of electrical energy being assumed to be 12.5 kilowatt hours, at an initial price rate of $.044 for the first 35 kilowatts. Reference to the beginning position illustrated in Fig. 3, in which the lugs 370 are all in engagement with the first or left-hand flanges 371, will reveal that the notched rate changing bar 276 is at such time in its extreme left-hand position, with all of its several notches 290, 291, 292, and 293 out of registration with the corresponding pawl arms 268. All of said pawl arms hence remain latched on bar 276, no cam follower lever 230, 231, etc., is in operative association with its corresponding cam, and, in this phase of operation, no operation of the visible or printing price counters will occur. Successive energizations of motor M will, however, effect operation of the visible and printing kilowatt hour counters. Operation thus occurs in this manner until 12.5 kilowatt hours are registered on the latter counters, at which time the notches 395 in the left-hand flanges 371 of the four sets of such flanges are aligned with one another and with the blade lugs 370, as aforesaid. And at such time, as previously described, rate changing bar 276 shifts over one position, lugs 370 then engaging the second flanges 371, and the first notch 290 in rate-change bar 276 then registering with its associated pawl 268.

This releases said pawl 268 and the first cam follower lever 230, the latter moving at once into operative association with first cam 194, which is the highest speed cam of the series. Thereupon, the rotating cam 194 operates through the mechanism heretofore described to intermittently actuate the visible and printing price counters, which will be recalled as being given one actuation for each revolution of said cam 194. The gear train driving cam 194 is so determined that the visible and printing price counters register accumulating price at the initial charge rate, here assumed to be $.044 per kilowatt hour. When 35 kilowatt hours have thus been consumed, the price rate is to be decreased, as for instance to $.022 for the next 65 kilowatt hours. The second flanges 371 are accordingly so set that their notches will come into alignment with one another and with the rate change bar at a reading of 35 kilowatt hours on the visible kilowatt hour counter, whereupon the rate change bar will shift over to its third position, with the lugs 370 against the third flanges 371. It may occur that at the time the kilowatt hour counter registers 35 kilowatt hours, and the notches in the second flanges 371 first come into alignment to permit movement of the rate change bar, the cam lever 230 will not have had an opportunity to clear the end of the cam, and will still occupy some such position as that of Fig. 5, rather than the position of Fig. 5a. In such case, the pawl arm 268 carried by said lever 230 will for a very short additional time occupy a position within the notch 290 of the rate change bar, and so prevent the latter from shifting. It is for this reason that the notch in the second flange 371 for the first counter is given somewhat increased width, so that the path for the rate change bar will still be open even though the counter wheel 93' should be advanced an additional step or two before the cam lever 320 drops down and removes its pawl arm 268 from the notch 290. The moment this last occurs, the rate change bar will shift over. The very slight error so introduced by this momentary delay in rate change is entirely negligible, as will be obvious. It may here be mentioned that the widened notches in the third and fourth flanges 371 associated with the first counterwheel 93' are for the same purpose, and are made progressively wider, as before described, for the reason that the successive cams 195 and 196 operating in respective conjunction therewith are progressively slower, calling for additional protection against the indicated possibility of hanging up.

The rate change bar having shifted over to its third position, as aforesaid, the second rate change bar notch 291 is in registration with the second pawl arm 268, which is therefore released to establish operation of the second cam 195 in conjunction with the second cam lever 231. This second cam is driven at a reduced rate of speed, and puts the reduced rate of $.022 per kilowatt hour into effect. The first cam lever 230 will be elevated by the cam 194, and at the maximum point of lift, will be latched by its pawl arm 268 back on the rate change bar, the notch 290 in the latter now having been carried to the right of said pawl arm. And the pivotal action of the pawl arm 268 as it engages the rate change bar causes the pawl 266 to release crank arm pin 265, this occurring before the crank 260 has been elevated sufficiently for trip lever 317 to have been tripped by arm 310, so that an additional actuation of the price counter by first cam 194 is avoided.

Operation under control of second cam 195 will thus then occur, with electrical energy being charged for at the rate of $.022 per kilowatt hour, until 65 additional kilowatts are registered. At this time, a total of 100 kilowatts having been registered, another rate change occurs, in a manner similar to the last, third cam 196 becomes effective, and the price counters accumulate at a rate of $.015 per kilowatt hour for the next 100 kilowatt hours. At 200 kilowatt hours, the final rate change occurs, the rate bar lugs 370 passing through the notches in the fourth flanges 371 and coming against the respective counterwheels (Fig. 13) to register the last notch 293 with the last pawl arm 268, thereby placing the last and slowest cam 197 in effect. This last cam is driven at such a speed as to establish a charge rate of $.0125 for all consumption over 200 kilowatt hours.

Printing and re-setting mechanism

At periodic intervals a printed record is made of the kilowatt hours consumed during the billing period and the total price charged therefor. The printed record is made upon a bill, preferably in the form of a card, which the utility company representative carries and upon which is simultaneously printed the date and name and address of the consumer. It is deemed preferable that the printing be done three times in vertically spaced position on successive sections of the card, which is horizontally perforated between the three printing positions, so that two copies may be left with the consumer and one retained by the company representative and turned in by him at the company's office. The purpose of leaving two copies with the consumer is to allow him to retain one as a permanent record and to enclose the other with his remittance. The meter recorder of the invention, in its preferred form, is accordingly designed to print three successive impressions upon such a billing card. The card 400 will be in a form suitable for billing and will preferably contain at the proper place the notation "kilowatt hours" and the dollar sign and any other data desired by the utility company.

A pair of U-shaped card guides 403 and 404 are arranged to receive and guide the vertical edges of the card 400 introduced to the casing via the entrance slot 52, the card when printed being ejected through the outlet slot 53 in the bottom of the casing. Secured to the upper ends of these card guides are mountings 405 formed with flaring mouths 406 adapted to receive the card and to guide it into the guides 403 and 404, and the mountings 405 are secured to supporting posts 407 (see Fig. 3) extending inwardly from the upper portions of printing roller guide plates 410. The latter are tightly secured at their lower ends to outward projections 411 formed on the extremities of forwardly projecting bracket arms 412 and 413. Clips 415 secured to the upper sides of the forward end portions of these bracket arms 412 and 413 support the lower portions of the card guides 403, as clearly appears in Figs. 3 and 19.

A round keyhole 420 extends inwardly through a boss 421 on left-hand printing roller guide plate 410 and through post 407 and mounting 405, thence continuing as a semi-round groove 420a in the forward face of frame member 160, as clearly indicated in Fig. 3. A key 422 on whose semicylindric shank 423 is formed a date stamp 424 corresponding to the date of meter reading, is inserted by the meter operator in this keyhole through a suitable keyhole in outer casing C, with the date stamp properly positioned in the vertical printing plane of the printing counters 110 and 150. The date on this stamp will print on the card 400, as will later appear.

The lower frame member 161 includes a vertical wall portion 430 whose forward face is just to the rear of the vertical printing plane, and this wall portion is recessed to receive a printing plate 431 containing the name and address of the consumer in printing type, this printing plate being typically of the character commonly known as an "addressograph" plate or its equivalent, and the printing type thereon being understood to be in the vertical printing plane.

From the upper edge of upper frame member 160 to the lower edge of lower frame member 161 is stretched an inked ribbon 434, clamped in place by bars 435 and 436 secured to the respective frame members 160 and 161. This inked ribbon is of a size sufficient to cover all the printing type previously described and remains stationary for all printing operations. It is spaced slightly from the type so that it will not interfere with rotation of the type wheels.

An operating crank 450 carried by the meter operator has a square shank 451 adapted to be inserted through an opening 452 in the side of the casing C, the square shank 451 entering a corresponding square socket 453 extending longitudinally through a hub or cylinder 454, which is rotatably supported near its inner end in the of a circular spring 390, which is arranged so that the same spring will lock two of the rings to the hub in selected adjusted positions by inserting the two ends or tails of each spring through holes 391 in the hub and into selected holes 388 in the ring.

Each ring flange 371 is formed with a notch 395, the circumferential position of which with reference to hub 372 is adjustably determined by the spring-locking mechanism last described. These notches 395 are of sufficient width to pass the lugs 370 on the blade 277 of the rate changing device when registered therewith. For the purpose of all but the right hand set of flanges 371, i. e., those associated with the right hand counterwheel 93', these notches may be relatively narrow (see Fig. 16), being of just sufficient width to pass the rate changing blade easily, or with relatively small working clearance. For the purpose of the right hand set of flanges, associated with the right hand or tenths counterwheel 93', it is desirable for a reason that will later appear that some of these notches be of somewhat increased widths. For instance, the notch in the flange 371 furthest to the left from the counterwheel 93' may have a relatively narrow notch of the type shown in Fig. 16, for instance, of an angle of about 12°; the next flange toward the right may have an approximately 48° notch; the next flange may have an approximately 84° notch; and the remaining flange may have an approximately 120° notch. It is to be understood that these increases in the widths of the second, third and fourth flange notches associated with the first counterwheel 93' are on the back sides of the notches; that is to say, the widening is done in a direction extending backwardly with respect to the direction of rotation, so that any given one of such widened notches will register with the rate bar lugs 370 simultaneously with the narrow notches in the corresponding flanges associated with the remaining counterwheels, but will then remain registered therewith while the counterwheel 93' is stepped one or more times ahead.

At the beginning of operation, the lugs 370 on blade 277 engage the left hand faces of the left hand flanges 371 of the four sets of such flanges, as appears in Fig. 3. At a predetermined point in the operation of the counter, the notches 395 in the four left-hand flanges of the four sets of flanges come into alignment, whereupon the lugs 370 are permitted to enter and pass through said notches, and the blade 277 thus being freed of interference from the flanges, the blade and bar 276 are shifted toward the right, or in the direction of the arrow in Fig. 13, by a spring 399 connected between bar 276 and the frame structure of the recorder. The travel of the blade 277 as described, is, however, only the distance from the face of the first flanges 371 to the corresponding faces of the second flanges 371, since the notches 395 in the second flanges will not then be in alignment with one another and with the lugs 370, and the lugs 370 will accordingly engage the second flanges 371. This travel of blade 277 and bar 276 registers first notch 290 with first pawl arm 268, thus releasing the latter and putting the first cam 194 into operative effect. At predetermined points in the subsequent operation of the counter, the notches in the second, third and fourth flanges come successively into register, causing movements of the blade 277 and bar 276 such as bring the bar notches 291, 292, and 293 into register with their corresponding pawl arms 268, and thus putting the second, third and fourth cams into successive operative effect.

In accordance with the preferred form of the invention, there is provided certain reset mechanism, hereinafter described, which resets the visible and printing price counters to a minimum price of $.55 at the time the kilowatt hour counters are reset to zero kilowatt hours. Accordingly, it becomes necessary that the price-registering mechanism remain inactive until a quantity of electrical energy corresponding to a charge of $.55 has been consumed, this quantity of electrical energy being assumed to be 12.5 kilowatt hours, at an initial price rate of $.044 for the first 35 kilowatts. Reference to the beginning position illustrated in Fig. 3, in which the lugs 370 are all in engagement with the first or left-hand flanges 371, will reveal that the notched rate changing bar 276 is at such time in its extreme left-hand position, with all of its several notches 290, 291, 292, and 293 out of registration with the corresponding pawl arms 268. All of said pawl arms hence remain latched on bar 276, no cam follower lever 230, 231, etc., is in operative association with its corresponding cam, and, in this phase of operation, no operation of the visible or printing price counters will occur. Successive energizations of motor M will, however, effect operation of the visible and printing kilowatt hour counters. Operation thus occurs in this manner until 12.5 kilowatt hours are registered on the latter counters, at which time the notches 395 in the left-hand flanges 371 of the four sets of such flanges are aligned with one another and with the blade lugs 370, as aforesaid. And at such time, as previously described, rate changing bar 276 shifts over one position, lugs 370 then engaging the second flanges 371, and the first notch 290 in rate-change bar 276 then registering with its associated pawl 268.

This releases said pawl 268 and the first cam follower lever 230, the latter moving at once into operative association with first cam 194, which is the highest speed cam of the series. Thereupon, the rotating cam 194 operates through the mechanism heretofore described to intermittently actuate the visible and printing price counters, which will be recalled as being given one actuation for each revolution of said cam 194. The gear train driving cam 194 is so determined that the visible and printing price counters register accumulating price at the initial charge rate, here assumed to be $.044 per kilowatt hour. When 35 kilowatt hours have thus been consumed, the price rate is to be decreased, as for instance to $.022 for the next 65 kilowatt hours. The second flanges 371 are accordingly so set that their notches will come into alignment with one another and with the rate change bar at a reading of 35 kilowatt hours on the visible kilowatt hour counter, whereupon the rate change bar will shift over to its third position, with the lugs 370 against the third flanges 371. It may occur that at the time the kilowatt hour counter registers 35 kilowatt hours, and the notches in the second flanges 371 first come into alignment to permit movement of the rate change bar, the cam lever 230 will not have had an opportunity to clear the end of the cam, and will still occupy some such position as that of Fig. 5, rather than the position of Fig. 5a. In such case, the pawl arm 268 carried by said lever 230 will for a very short additional time occupy a position within the notch 290 of the rate change bar, and so prevent the latter from shifting. It is for this reason that the notch in the second flange 371 for the first counter is given somewhat increased width, so that the path for the rate change bar will still be open even though the counter wheel 93' should be advanced an additional step or two before the cam lever 320 drops down and removes its pawl arm 268 from the notch 290. The moment this last occurs, the rate change bar will shift over. The very slight error so introduced by this momentary delay in rate change is entirely negligible, as will be obvious. It may here be mentioned that the widened notches in the third and fourth flanges 371 associated with the first counterwheel 93' are for the same purpose, and are made progressively wider, as before described, for the reason that the successive cams 195 and 196 operating in respective conjunction therewith are progressively slower, calling for additional protection against the indicated possibility of hanging up.

The rate change bar having shifted over to its third position, as aforesaid, the second rate change bar notch 291 is in registration with the second pawl arm 268, which is therefore released to establish operation of the second cam 195 in conjunction with the second cam lever 231. This second cam is driven at a reduced rate of speed, and puts the reduced rate of $.022 per kilowatt hour into effect. The first cam lever 230 will be elevated by the cam 194, and at the maximum point of lift, will be latched by its pawl arm 268 back on the rate change bar, the notch 290 in the latter now having been carried to the right of said pawl arm. And the pivotal action of the pawl arm 268 as it engages the rate change bar causes the pawl 266 to release crank arm pin 265, this occurring before the crank 260 has been elevated sufficiently for trip lever 317 to have been tripped by arm 310, so that an additional actuation of the price counter by first cam 194 is avoided.

Operation under control of second cam 195 will thus then occur, with electrical energy being charged for at the rate of $.022 per kilowatt hour, until 65 additional kilowatts are registered. At this time, a total of 100 kilowatts having been registered, another rate change occurs, in a manner similar to the last, third cam 196 becomes effective, and the price counters accumulate at a rate of $.015 per kilowatt hour for the next 100 kilowatt hours. At 200 kilowatt hours, the final rate change occurs, the rate bar lugs 370 passing through the notches in the fourth flanges 371 and coming against the respective counterwheels (Fig. 13) to register the last notch 293 with the last pawl arm 268, thereby placing the last and slowest cam 197 in effect. This last cam is driven at such a speed as to establish a charge rate of $.0125 for all consumption over 200 kilowatt hours.

*Printing and re-setting mechanism*

At periodic intervals a printed record is made of the kilowatt hours consumed during the billing period and the total price charged therefor. The printed record is made upon a bill, preferably in the form of a card, which the utility company representative carries and upon which is simultaneously printed the date and name and address of the consumer. It is deemed preferable that the printing be done three times in vertically spaced position on successive sections of the card, which is horizontally perforated between the three printing positions, so that two copies may be left with the consumer and one retained by the company representative and turned in by him at the company's office. The purpose of leaving two copies with the consumer is to allow him to retain one as a permanent record and to enclose the other with his remittance. The meter recorder of the invention, in its preferred form, is accordingly designed to print three successive impressions upon such a billing card. The card 400 will be in a form suitable for billing and will preferably contain at the proper place the notation "kilowatt hours" and the dollar sign and any other data desired by the utility company.

A pair of U-shaped card guides 403 and 404 are arranged to receive and guide the vertical edges of the card 400 introduced to the casing via the entrance slot 52, the card when printed being ejected through the outlet slot 53 in the bottom of the casing. Secured to the upper ends of these card guides are mountings 405 formed with flaring mouths 406 adapted to receive the card and to guide it into the guides 403 and 404, and the mountings 405 are secured to supporting posts 407 (see Fig. 3) extending inwardly from the upper portions of printing roller guide plates 410. The latter are tightly secured at their lower ends to outward projections 411 formed on the extremities of forwardly projecting bracket arms 412 and 413. Clips 415 secured to the upper sides of the forward end portions of these bracket arms 412 and 413 support the lower portions of the card guides 403, as clearly appears in Figs. 3 and 19.

A round keyhole 420 extends inwardly through a boss 421 on left-hand printing roller guide plate 410 and through post 407 and mounting 405, thence continuing as a semi-round groove 420a in the forward face of frame member 160, as clearly indicated in Fig. 3. A key 422 on whose semicylindric shank 423 is formed a date stamp 424 corresponding to the date of meter reading, is inserted by the meter operator in this keyhole through a suitable keyhole in outer casing C, with the date stamp properly positioned in the vertical printing plane of the printing counters 110 and 150. The date on this stamp will print on the card 400, as will later appear.

The lower frame member 161 includes a vertical wall portion 430 whose forward face is just to the rear of the vertical printing plane, and this wall portion is recessed to receive a printing plate 431 containing the name and address of the consumer in printing type, this printing plate being typically of the character commonly known as an "addressograph" plate or its equivalent, and the printing type thereon being understood to be in the vertical printing plane.

From the upper edge of upper frame member 160 to the lower edge of lower frame member 161 is stretched an inked ribbon 434, clamped in place by bars 435 and 436 secured to the respective frame members 160 and 161. This inked ribbon is of a size sufficient to cover all the printing type previously described and remains stationary for all printing operations. It is spaced slightly from the type so that it will not interfere with rotation of the type wheels.

Figure 19:
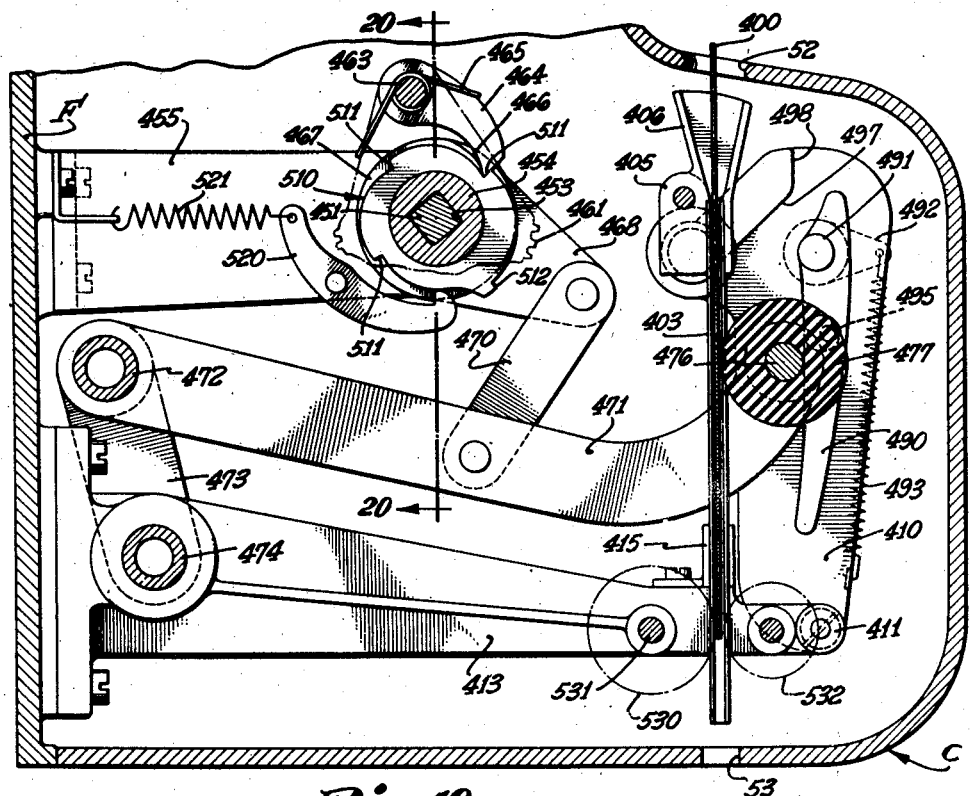
Fig. 19 is a view on broken line 19—19 of Fig. 3.
Figures 20, 21:
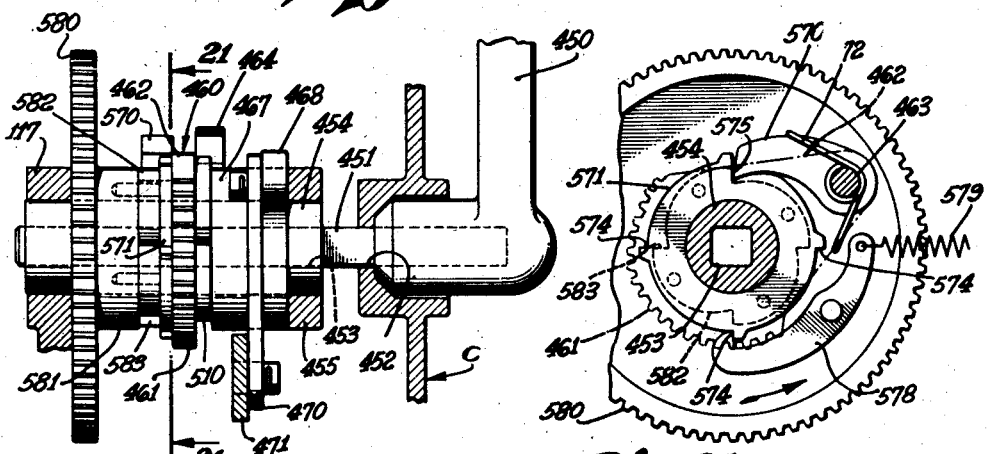
Fig. 20 is a section on line 20—20 of Fig. 19.
Fig. 21 is a section on line 21—21 of Fig. 20.

An operating crank 450 carried by the meter operator has a square shank 451 adapted to be inserted through an opening 452 in the side of the casing C, the square shank 451 entering a corresponding square socket 453 extending longitudinally through a hub or cylinder 454, which is rotatably supported near its inner end in the aforementioned bracket 117 and near its outer end in a bracket 455 projecting from frame panel F (Figs. 19 and 20).

The hub 454, which thus extends the full distance between brackets 117 and 455, is adapted to be rotated 90° at a time by pulling down the crank 450. In the operation of the device, this hub is rotated through a complete revolution by four 90° movements of the crank, the first three being utilized to print the card, and the fourth to reset the recorder.

Figure 17:
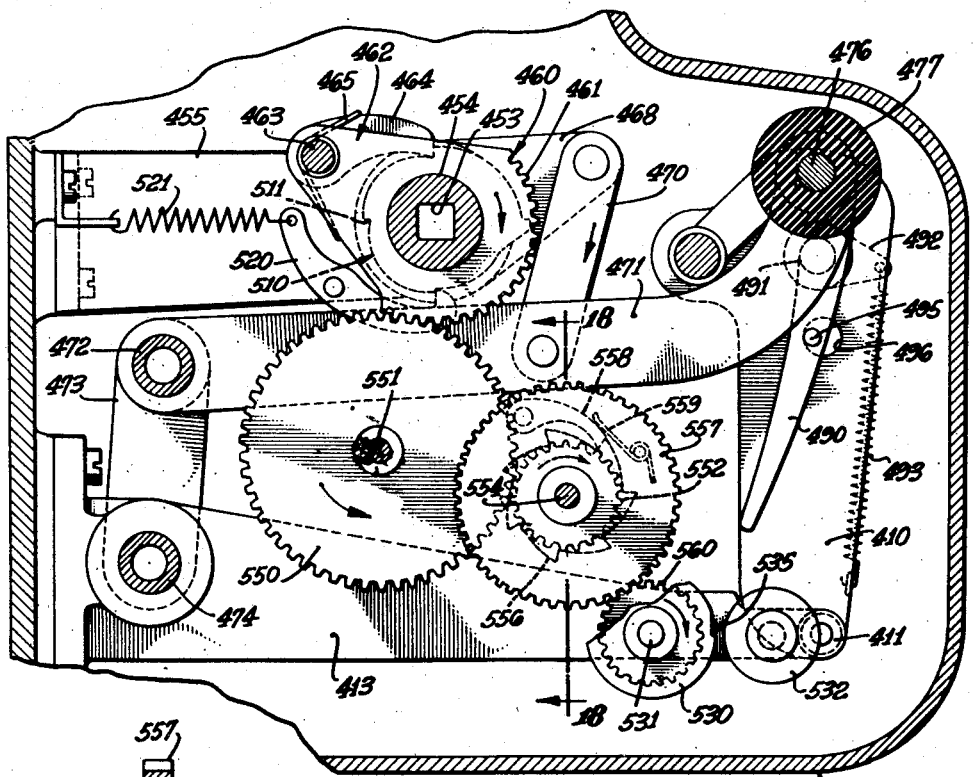
Fig. 17 is a section on broken line 17—17 of Fig. 3.

Tightly secured to hub 454 near its center is a member 460 comprising a gear segment 461 and an oppositely projecting arm or extension 462. A pin 463 carried by this arm 462 and projecting in both directions therefrom carries on one projecting portion a pawl 464, which is normally urged inwardly by a spring 465. Pawl 464 is adapted to engage in a notch 466 formed in the hub 467 of an arm 468 rotatably mounted on hub 454 adjacent bracket 455, whereby a 90° movement of pawl carrying arm 462, accomplished by a similar 90° movement of crank 450, acts through pawl 464 and said notch 466 in hub 467 to impart a like 90° rotation to arm 468. The normal position of the parts thus described appears in Fig. 17, Fig. 19 showing the arms 462 and 468 rotated part-way through their 90° strokes.

The free end of arm 468 is connected by link 470 with an intermediate point on one of a pair of printing roller carrying arms 471. The two printing roller carrying arms 471 are pivotally mounted at their rearward ends on a hollow shaft 472, which is carried by the swinging ends of a pair of crank arms 473, the other ends of which are secured to a hollow shaft 474 rotatably mounted in suitable bearings carried by the aforementioned brackets 412 and 413. The arms 471 project forwardly from their crank arm mountings between the aforementioned printing roller guide plates and the adjacent card guides, as appears in Fig. 3, and carry at their forward ends a shaft 476 on which is mounted the rubber printing roller 477. This printing roller 477 is adapted to press the card 400 against printing ribbon 434 and the underlying type as the roller is rolled down the back face of the card with downward movement of the carrying arms 471. Such movement of the printing roller and arms 471 is accomplished by downward movement of the arm 468 and link 470, as described above. A spring 480 connected to one of the printing roller carrier arms 471 and extending upwardly and rearwardly therefrom to a point of connection with a bracket 481 (see Fig. 4) draws the arms 471 upwardly and rearwardly, in such manner as to compress the printing roller against the back face of the card during the downward movement of the roller, and also so as to return the arms 471 and roller, as well as 470 and arm 468, in an upward direction at the completion of the downward printing stroke.

The two end portions of printing roller shaft 476 project outwardly beyond carrier arms 471 and are engaged by ramp cams 490 which are pivotally mounted near their upper ends on the inner faces of the aforementioned guide plates 410. The pivotal mountings for the cams include pivot pins 491 rotatably mounted in the guide plates 410, and these pivot pins carry arms 492, to which are connected springs 493 anchored to the plates 410. These springs urge the cams 490 toward the left, as viewed in Fig. 19. The travel of the cams toward the left as viewed in Figs. 17 and 19 is limited by stop pins 495 projecting from the sides of the cams and engaging in holes 496 in plate 410. The printing roller carrying shaft 476 in traveling downwardly (Fig. 19) engages the forward edges of cams 490 and forces them rearwardly, as well as being pressed by the spring actuated cams into engagement with the printing ribbon. At the lower end of the stroke of the arms 471, shaft 476 has cleared the lower ends of cams 490, which thereupon move to the position of Figs. 5 and 17.

When the operating crank 450 is returned through its 90° return stroke, printing roller carrier arms 471, as well as link 470 and arm 468, return in an upward direction to their original positions by virtue of the action of spring 480 (Fig. 4). In the course of such action, the printing roller carrier shaft 477 engages the outside or rearward edges of the ramp cams 490, which thus support the printing roller in a spaced position from the inking ribbon on the return trip. The parts are shown at the top, in readiness for the next printing actuation, in Fig. 17.

In the position of Fig. 17, the printing roller is not yet in engagement with the inking ribbon, and there is accordingly provided a cam means adapted to guide the printing roller during the first portion of its downstroke until contact has been made with the inking ribbon. This cam means comprises downwardly inclined cam elements 497, formed integrally with the guide plates 410, and adapted for engagement with the two ends of roller carrier shaft 476. Above the sloping cam elements 497 are provided seats 498 on which the shaft 477 comes to rest after it clears the upper ends of the cams 490.

At this point may conveniently be described a means adapted to support the printing type wheels in proper position during the action of the printing roller. With particular reference to Figs. 22 and 23, numeral 500 designates generally a comb having projecting teeth 501 adapted to move in between the counter wheels of the two printing counters so as to engage the teeth 502 of the toothed discs associated with the respective counter wheels. The position of engagement of these teeth 501 of the comb with the teeth 502 of the notched discs is illustrated in full lines in Fig. 22 and in Fig. 23, and it will be evident that at such time the comb cooperates with the detents 503 to support the toothed disc and counter wheels in proper position for the printing operation. The comb 500 normally occupies a retracted position, indicated in dot-dash lines in Fig. 22. It is provided with a rearwardly projecting actuating bar 504 slidable in a way 505 formed in a frame assembly 505a secured to and projecting rearwardly from the frame member 160, as clearly appears in Figs. 22 and 23. A coil spring 506 retracts the comb, and the comb is advanced by one arm of a lever 507 pivotally mounted at 508 and whose other arm is engaged and moved in a rearward direction by the shaft 472 on which the rearward ends of the printing roller carrier arms 471 are mounted. As the arms 471 move downwardly to carry the printing roller from the position of Fig. 17 toward the printing plane, they also move somewhat rearwardly, causing a corresponding rearward movement of the shaft 472. In the course of this rearward movement, shaft 472 swings lever 507 in the direction of the arrow in Fig. 22, its arm in engagement with bar 504 advancing the latter to move the comb 500 to the advanced position shown in full lines in Figs. 22 and 23. At the termination of the printing stroke, shaft 472 moves somewhat forwardly, releasing lever 507, and the comb thereupon is retracted to release the counter wheels by action of spring 508.

Rotatably mounted on hub 454, between arm hub 467 and member 460, is what I may term a control ratchet disc 510 Figs. 17, 19 and 20, formed with three 90° spaced notches 511 engageable by pawl 464, and a depth equal to the depth of notch 466 in arm hub 467. At the fourth 90° position, the disc is provided with a lug and pawl-engaging notch 512 which is higher or outside the surface of hub 467.

Fig. 17 shows the position of this control ratchet 510 prior to the first actuation of hand crank 450, and shows that pawl 464 is in engagement with arm hub notch 466 and also with what may be regarded as the first of the three notches 511 of the control ratchet which are of the same depth as the hub notch 466. Fig. 19 shows the parts at a mid position in the course of the first actuation of the hand crank, the control ratchet being seen to be advanced along with the hub 467 of arm 468. After a 90° actuation of the crank, arm 468 and hub notch 466 return to the position of Fig. 17, leaving control ratchet 510 advanced 90° from the position of Fig. 17 in a clock-wise direction. The second and third 90° actuations of the hand crank are similar in effect, advancing the control ratchet by successive 90° rotations. The third actuation of the hand crank, however, leaves the control ratchet with its high, fourth notch 512 in engagement with the pawl 464, and said notch 512, being outside the radius of arm hub 467, prevents the pawl 464 this time from dropping into hub notch 466. On the fourth actuation of the hand crank, therefore, the control ratchet will be advanced 90°, as before, but arm 468, and therefore the printing roller, will remain stationary. To prevent reverse rotation of the control ratchet, a detent 520 (Fig. 17) is provided, this detent being adapted to engage the successive notches 511 and 512 of the control ratchet, and being urged into engagement therewith by means of coil spring 521.

As stated above, the present embodiment of the invention is in a form designed to print three times in successive printing positions on the card 400, the card subsequently being torn into three complete bills along perforated lines provided for the purpose. The card is accordingly positioned successively in three printing positions, and is then ejected from the recorder. When the card is initially inserted, it is positioned in the first printing position by positioning means later to be described. The return strokes of the first two actuations of the hand crank 450 then operate, through mechanism presently to be described, to advance the card to the second and third printing positions, respectively, while the return stroke of the crank on its third actuation operates to eject the card from the recorder. The fourth actuation of the crank resets the counters and returns the entire recorder to its initial condition.

The card feeding mechanism includes a pair of knurled rollers 530 aligned with the plane of the card 400 supported by the card guides, and mounted on a shaft 531 supported in suitable bearings carried by the brackets 412 and 413. Co-operating with the knurled rollers 530 are idler rollers 532, preferably rubber tired, and adapted to engage the face of the card opposite the rollers 530. These idler rollers 532 may also be supported by the brackets 412 and 413, as indicated. Knurled rollers 530 are formed with card positioning notches 535 which when the card is first inserted are in position to be engaged by the lower edge thereof to initially position the card in its first printing position (see Fig. 7).

Figure 18:
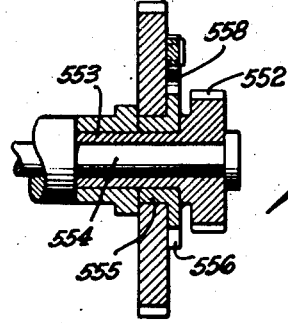
Fig. 18 is a section on line 18—18 of Fig. 17.

The present illustrative mechanism for rotating the knurled rollers 530 to feed the card will next be described. The aforementioned gear segment 461 (Fig. 17) meshes with a spur gear 550, rotatably mounted on a stub shaft 551, which may be supported in any suitable manner, as on bracket 117, and gear 550 meshes with a smaller spur 552 which has an integral gear sleeve 553 (Figs. 17 and 18), said gear and sleeve being rotatably mounted on a stub shaft 554 understood to project from and be mounted on the adjacent bracket 117. Tightly mounted on gear sleeve 553 is the hub 555 of a ratchet wheel 556, having preferably an odd number of ratchet teeth, here seven in number, and rotatably mounted on hub 555 is a spur gear 557 pivotally carrying a pawl 558 which is engageable by the ratchet wheel 556, a spring 559 carried by the gear urging said pawl against the ratchet wheel. Gear 557 meshes with a small spur gear 560 tightly mounted on the shaft 531 that carries the knurled rollers 530. The circumference of the rollers 530 is made such that one complete rotation thereof advances the card one-third of its height, which is of course the interval between the successive printing positions.

The gear train 461, 550, 552 is so calculated that gear 552, and therefore ratchet wheel 556, makes a one-half turn oscillation for each 90° oscillation of the gear segment 461. On the downstroke of the gear segment (downstroke of the hand crank), the ratchet turns in the direction of the arrows in Fig. 17, and no movement is imparted to pawl 558 and gear 557. On the return or upstroke, however, assuming a seven tooth ratchet wheel, ratchet 556 turns through one-fourteenth of a turn to pick up the pawl 558, and then in turning through the remaining six-fourteenths of the half-turn advances the pawl 558 and gear 557 with it. The gears 557 and 560 are so designed that this rotation of gear 557 turns the card feeding rollers 530 through precisely 360° of rotation. The delay in the engagement of the ratchet wheel with the pawl 558 gives time for the printing roller to move away from the printing plane before the rollers 530 begin to advance the card. By providing an odd number of ratchet teeth on the ratchet wheel, the pawl 558 is always left in the position of Fig. 17 at the end of its movement, and a clock-wise rotation of the ratchet wheel of substantially a half-turn will provide the described delayed card feeding action.

As previously stated, the card is initially inserted into the recorder to a position with its lower edge in engagement with the printing roller notch 535 (Figs. 7 and 17). The card is then in its first printing position. The first 90° reciprocation of the hand crank then acts, as before described, to print the card at its first printing position on the downstroke of the crank, and to advance the card to the second printing position on the upstroke of the crank. The next reciprocation of the crank prints the card at its second printing position, and then advances the card to its third printing position. And the third reciprocation of the crank prints the card at its third printing position, and then advances the card to eject it from the recorder. The fourth reciprocation of the crank then operates to reset the mechanism as now to be described.

Mounted on the aforementioned pivot pin 463 carried by arm 462, on the side of the latter opposite from the pawl 464, is a pawl 570 which is adapted to cooperate with a control ratchet disc 571 which is rotatably mounted on the hub 454 (Figs. 20 and 21). A spring 572 urges the pawl 570 into cooperation with this ratchet disc. Ratchet disc 571 is formed with three 90° spaced notches 574 adapted to be engaged by the pawl 570, and with a fourth 90° spaced notch 575 which is cut substantially deeper than the notches 574, as clearly appears in Fig. 21, the latter notch also being adapted for cooperation with the pawl 570, which moves inwardly toward the center of the ratchet disc when in engagement therewith.

A detent 578, pivotally mounted preferably on the same stud that carries the detent 520, prevents reverse rotation of the control ratchet gear 571, a spring 579 urging said detent into cooperation with the ratchet disc.

Also freely rotatably mounted on hub 454 is a spur gear 580, to the hub 581 of which is secured a ratchet disc 582, the latter having four 90° spaced notches 583 of the same depth as the deep notch 575 in control ratchet 571. On the first three downstrokes of the crank 450, pawl 570 is in engagement with high notches 574 of control ratchet 571, and thus is held out of engagement with ratchet 583, so that no rotation is imparted to the latter. At the end of the third upstroke of crank 450, pawl 570 drops into deep notch 575 of ratchet disc 571, and therefore into engagement with one of the notches 583 of ratchet disc 582. Accordingly, on the fourth downstroke of crank 550, ratchet disc 582, and therefore gear 580, are rotated through 90° in the direction of the arrow in Fig. 21. The gear 580, thus rotated through a quarter turn on the fourth actuation of crank 450, is in mesh with a small gear 590 on price counter shaft 130 (Figs. 3 and 13), and with a similar small gear 591 on shaft 116 of printing kilowatt hour counter shaft 116 (Figs. 3 and 22).

On the end of price counter shaft 130, to which gear 590 is secured, as aforementioned, is secured a similar gear 594 (Figs. 3 and 13) which meshes with an idler gear 595, the latter in turn meshing with a gear 596, of the same diameter as gear 594, mounted on the extremity of the visible kilowatt hour counter shaft 77 (Figs. 3 and 13). Shaft 116, on which the gear 591 is mounted, will be recalled as extending through both the printing price and printing kilowatt hour counters. The several counter shafts 77, 130 and 116 are rotated simultaneously through one complete turn as a result of a quarter turn of the driving gear 580, and such rotation of said shaft acts in the same manner to reset the several counters to the starting point. The nature of this operation will be described with reference to the visible kilowatt hour counter, and will be understood to be the same for all.

Referring to Figs. 3 and 10 to 16, and to the foregoing description, it will be observed that the visible kilowatt hour counter shaft 77 remains stationary while the counter is operated to register current consumption, and that as kilowatt hours are registered, the double-ended pawl 380 (Figs. 15 and 16) will slip out of the notch 382 in shaft 77 and ride around on the periphery of said shaft. In resetting, the shaft 77 is rotated in the direction of the arrow in Fig. 16, and at some point in its 360° of rotation, the notch 382 engages the cooperating arm of pawl 380 and acts through said pawl to impart a rotation to counter hub 390, and therefore to the counterwheel to which the hub is secured. The direction of this rotation will be seen to be the same as the direction of normal travel, the counterwheels thus being carried on around to their initial starting point.

Inasmuch as in the present embodiment of my invention the visible price and printing price counters are designed to be reset initially to a minimum price, here illustrated as $.55, the first two counterwheels of said counters are so arranged on their respective hubs as to be carried past zero to the $.55 position, as will be understood.

Tightly mounted on the two end portions of visible price counter shaft 77 are cams 600 and 601, which are adapted to cooperate with the rate change device to reset the latter to starting position during and by virtue of the rotation of shaft 77 in resetting the visible kilowatt hour counter. The cam 600 on the left-hand end of the shaft has the general configuration of a screw, embodying a blade 602 which extends substantially 360° around the shaft, with the first and last 90° portions 602a and 602b of the convolution in planes at right angles to the shaft, and the connecting 180° portion 602c formed as a spiral, as illustrated. This blade 602 is engageable with a lug 604 projecting upwardly from the left-hand end of the blade 277 of the rate-changing device for the purpose of shifting said blade toward the left, as clearly appears in Figs. 3 and 13. The rate-changing bar being, for instance, in such a position as illustrated in Fig. 13, the resetting operation of the mechanism involves a 360° rotation of cam 600 from and back to the position of Figures 7 and 13. In the course of this rotation, the blade 602 picks up the lug 604 of the bar 277, and, the bar being depressed by another action of the cam, in a manner presently to be described, until its lugs 370 clear the flanges 371 of the counter mechanism, the blade 277 and bar 276 are drawn to the left, against spring 399, to the starting position of Fig. 3.

The cams 600 and 601 also cooperate to depress the two ends of rate change blade 277 during the resetting operation. The design of the cam 600 to accomplish this action will first be described, it being understood the cam 601 has a similar functional effect. Blade 602 of cam 600 has for this purpose a variable radius, as appears in Fig. 7. The 90° portion 602b of the blade, which first picks up the lug 604 in the resetting operation, is of a beginning radius such as will just engage the upper edge 605 of the blade 277 in the position of Fig. 13, thus serving as a stop for upward movement of the blade under the pressure of springs 280. This portion 602b of the cam blade has a gradually increasing radius, as appears in Fig. 7, such as will cause the blade 277 to be substantially depressed against springs 280, so as to clear flanges 371, following a 90° turn of the cam. The spiral portion 602c of the cam blade is of constant radius, holding the blade 277 depressed, with the lugs 270 thereof out of engagement with flanges 371, during the movement of the blade 277 toward the left by that portion of the cam blade. The portion 602a of the cam blade has a gradually decreasing radius, permitting the blade 277 to rise back to the position of Fig. 3, returning the lugs 370 to engagement with the first flanges 371. The cam blade portion 602a terminates in a radial shoulder 606 (Fig. 7) which clears the lug 604 as the cam returns to the position of Fig. 7, so that the blade 277 is thereafter restrained against movement toward the right solely by the engagement of its lugs 370 with the first flanges 371. The cam 601 on the right hand end of the shaft 77 may be identical with the cam 600, though it need have only the function of depressing the right hand end of the blade 277, and is therefore here illustrated merely as having a variable radius similar to the variable radius of the cam 600, the function of drawing the rate-change blade 277 toward the left thus being delegated entirely to the left-hand cam 600.

Thus, accompanying the resetting of the counters, the blade 277 of the rate-changing device is depressed to clear the lugs 370 thereof from the flanges 371, and the blade 277 and bar 276 are then drawn toward the right to the initial starting position of Fig. 3. The depression of the blade 277 serves not only to clear the flanges 371, however, but serves also to move the slot filling lugs 296 (Figs. 5 and 13b) downwardly to the bottoms of the notches in the bar 276, whereby the bar 276 may be drawn to the left past the pawls 268 without release of the latter. In other words, the described depression of the blade 277 effectively closes said notches during the resetting operation of the rate-changing device.

*Modified rate changing mechanism*

Figs. 24 and 25 show a modified form of the invention, which may be regarded as exactly similar to the previously described form excepting for certain departures, as will be explained. For convenience, members in Figs. 24 and 25 corresponding to similar members in Figs. 1-23 are identified by corresponding reference numerals but with primes annexed.

The actuating motor M of the first described embodiment is replaced in this instance by a solenoid S, suitably installed in the meter recorder in the position indicated in Fig. 24. The armature 650 of this solenoid is connected by link 651 to gear segment 70', which is the same as the gear segment 70 of the first-described embodiment.

With reference to Fig. 25, rotor R' of the kilowatt hour meter drives shaft 33' through shaft 30', worm 31' and worm wheel 32', as in Fig. 2. Shaft 33' carries a disc 657 of insulating material which carries a contacting pin 658. This pin periodically engages a pair of contact arms 659 which are in the circuit of the solenoid S. The circuit of the solenoid also is shown as including a transformer T. The worm and worm wheel are so designed that the contact pin 658 completes the circuit to the solenoid once for each tenth of a kilowatt hour registered by the kilowatt hour meter.

Thus, for each circuit closure, the solenoid S is energized and its core 650 pulled down. The circuit being broken by the pin 658, the solenoid core, together with the link 651 and gear segment 70', as well as other parts operated thereby, are returned by any suitable return spring. For instance, such return action can be accomplished by a return spring 652 connected between the actuating arm 126' for the printing kilowatt hour counter and a suitable point on the frame structure. The spring located in such a position then acts through connecting link 124', the operating arm 125' for the yoke of the visible kilowatt hour counter, and through said yoke and the gear segment 75' to the gear segment 70', link 651 and solenoid core to elevate the latter when the solenoid is deenergized. It will be evident that such a solenoid system may, if desired, be substituted for the motor M in the first described form of the invention.

In the embodiment of Fig. 24, the shaft 225 and sleeve 225a of the first described form of the invention are substituted for by a single shaft 653. It will be recalled that in the first described form of the invention, the cam levers 230, 231, etc., are rotatably mounted on the sleeve 225a, and that the crank arms 260, 261, etc., are tightly mounted on said sleeve, while the shaft 225 rotatable inside said sleeve is drivingly connected with the operating yoke 142 for the visible price counter 135. In the form of Fig. 24, the same cam levers, such as 233', are relatively rotatable on the shaft 653, and the same crank arms, such as 263', are tightly mounted on said shaft. In these respects the shaft 653 corresponds to the sleeve 225a of the first embodiment. The shaft 653, on the other hand, also corresponds to the shaft 225 of the first embodiment, in that its end opposite to that seen in Fig. 24 is drivingly connected with the yoke for the visible price counter, in exactly the same way as the shaft 225 is illustrated to be drivingly connected with the yoke 142 in Fig. 13. The driving connection between shaft 653 and said yoke is not illustrated, but being exactly the same as the analogous driving connection between shaft 225 and yoke 142 clearly illustrated in Fig. 13, no additional illustration is deemed necessary. Accordingly, in the form of Fig. 24, operation of any one of the cranks such as 263' will directly operate the shaft 653 and therefore the visible price counter. Excepting for the changes noted, the complete machine of Fig. 24 may be exactly like that of Figs. 1-23.

Operation of the form of Fig. 24 insofar as such operation departs from the form of Figs. 1-23, is as follows: A given cam lever, as 233', having been released by the rate change bar for operative association with its corresponding cam, said lever is moved by its cam in the same way as is the cam lever of the first-described embodiment, and the associated crank arm will be latched to and will move therewith, just as in the first-described embodiment, as will be clearly understood. Such movement of the crank arm, however, will cause direct oscillation of the shaft 653, and therefore of the operating yoke for the visible price counter. As the cam lever and crank arm descend after passing the tip or maximum radius point on the corresponding cam, the counter is thus actuated to move one step ahead, the spring 241' which urges the cam lever in a counter-clockwise direction as viewed in Fig. 24 furnishing the driving force. The cam in its further rotation then eventually picks up the cam lever and moves it together with the crank arm back in a clockwise direction, and such action effects clockwise rotation of shaft 653 to return the counter operating yoke through its return stroke.

The printing price counter is correspondingly operated by means of an arm 654 tightly mounted on the end of shaft 653, and a link 655 connecting said arm with the operating arm 361' for said counter.

A further modification consists in substituting price counters which are designed for operation in reversed directions, so that they are advanced by the upstrokes of their operating yokes rather than by the downstrokes thereof. Such a substitution will be understood without the necessity of illustration, it being entirely obvious that the multiple pawls carried by the counter operating yokes may be turned over top for bottom and the counter designed for rotation in the reverse direction. In this form of the invention, the downstrokes of the price counter operating yokes resulting from counter-clockwise movement of the cam levers and cranks are the return strokes; and the upstrokes of said yokes, resulting from lifting of the cam levers and cranks by the cams, are the counter operating strokes. The last-described form of the invention has the advantage of positive operation of the counters by force supplied by the cams themselves.

As has previously been explained, the present invention is adaptable to use in conjunction with meters for measuring the consumption of various flowing substances or energies such as water, gas, electricity, etc. For the purpose of certain of the claims, the expression "element" is employed in a generic sense to denote any such flowing matter or energy, and it will be understood that when I refer therein to the "flow of an element," I intend the expression as denoting the flow of any such substance or energy as water, gas, oil, electricity, etc.

Many modifications within the broad purview of the invention will appear or occur to those skilled in the art. In this connection, it is of course to be understood that the present drawings and description are for illustrative purposes only, and are not to be taken as limitative on the invention, and that various changes in design, structure and arrangement may be made without departing from the spirit and scope of the invention as defined in the appended claims.

I claim as my invention:

1. In a device of the character described, the combination of: a unit counter including rotatable counter wheels and means to rotate said wheels, a second counter including rotatable counter wheels and means to rotate said wheels, a moving element common to both counters, gears adapted to operatively connect the moving element with the means to rotate the unit counter wheels, and a computing mechanism operatively connecting the moving element with the means to rotate the second counter wheels at a speed varying from the speed of the unit counter wheels, said computing mechanism including means altering the speed ratio between the unit counter wheels and the second counter wheels, in which said last named means comprises a plurality of rotatable members connected with the moving element common to both counters for simultaneous rotation at different speeds, driving connections between said rotatable members and the means to rotate the second counter wheels to rotate the latter, and a selector mechanism actuated by the unit counter to selectively render a given driving connection operative, the selector mechanism comprising a slidable bar adjacent the unit counter wheels formed with projections and slots, notched discs mounted for rotation with the unit counter wheels, the projections on the bar being adapted to enter the notches in the disc at successive stages of rotation and permit the bar to slide, and latches on the said driving connections adapted to hook on to the said bar to render the driving connections inoperative and to be released in turn through the slots on the bar to render successive driving connections operative as the bar slides to a new position.

2. In a device of the character described, the combination comprising: an actuating means, a unit counter operated by said actuating means, a price counter adapted to register price corresponding to the accumulated units registered on the unit counter, and means operated by the said actuating means and selectively controlled by the unit counter to operate the price counter at varying differentials from the unit counter, said last named means comprising a plurality of cams adapted to be simultaneously rotated by said actuating means, cam followers complementary to said cams operatively associated with said price counter, and means operated by said unit counter to selectively cause one only of said cam followers and its corresponding cam to operatively engage at a time.

3. In a device of the character described, the combination comprising: an actuating means, a unit counter operated by said actuating member, a price counter adapted to register price corresponding to the accumulated units registered on the unit counter, and means operated by the said actuating means and selectively controlled by the unit counter to operate the price counter at varying differentials from the unit counter, said last named means comprising a plurality of cams adapted to be simultaneously rotated at differential speeds by said actuating means, cam followers complementary to said cams operatively associated with said price counter, and means operated by said unit counter to selectively cause one only of said cam followers and its corresponding cam to operatively engage at a time.

4. In a device of the character described, the combination comprising: an actuating means, a unit counter operated by said actuating member, a price counter adapted to register price corresponding to the accumulated units registered on the unit counter, and means operated by the said actuating means and selectively controlled by the unit counter to operate the price counter at varying differentials from the unit counter, said last named means comprising a plurality of cams adapted to be simultaneously rotated by said actuating means, cam followers complementary to said cams operatively associated with said price counter, and latch means operated by said unit counter to selectively cause one only of said cam followers and its corresponding cam to operatively engage at a time.

5. In a device of the character described, the combination comprising: an actuating means, a unit counter operated by said actuating member, a price counter adapted to register price corresponding to the accumulated units registered on the unit counter, and means operated by the said actuating means and selectively controlled by the unit counter to operate the price counter at varying differentials from the unit counter, said last named means comprising a plurality of cams adapted to be simultaneously rotated by said actuating means, cam followers complementary to said cams operatively associated with said price counter, a shifter bar adapted for longitudinal movement transversely of the axes of said cams under control of said unit counter, and latch devices cooperating with said shifter bar to selectively cause one only of said cam followers and its corresponding cam to operatively engage at a time.

6. In a device of the character described, the combination comprising: an actuating means, a unit counter operated by said actuating member, a price counter adapted to register price corresponding to the accumulated units registered on the unit counter, and means operated by the said actuating means and selectively controlled by the unit counter to operate the price counter at varying differentials from the unit counter, said last named means comprising a plurality of cams adapted to be simultaneously rotated by said actuating means, cam followers complementary to said cams operatively associated with said price counter, a shifter bar adapted for longitudinal movement transversely of the axes of said cams under control of said unit counter, said shifter bar having slots therein, and latch devices engaging said shifter bar and spaced with respect to said slots so that a slot and a latch device are selectively registered upon shifting of said bar whereby the latch device is freed to cause one only of said cam followers and its corresponding cam to operatively engage at a time.

7. In a device of the character described, the combination comprising: an actuating means, a unit counter operated by said actuating member, a price counter adapted to register price corresponding to the accumulated units registered on the unit counter, and means operated by the said actuating means and selectively controlled by the unit counter to operate the price counter at varying differentials from the unit counter, said last named means comprising a plurality of cams adapted to be simultaneously rotated by said actuating means, cam followers complementary to said cams operatively associated with said price counter, a shifter bar adapted for longitudinal movement transversely of the axes of said cams under control of said unit counter, said shifter bar having slots therein, and latch devices engaging said shifter bar and spaced with respect to said slots so that a slot and a latch device are selectively registered upon shifting of said bar whereby the latch device is freed to cause one only of said cam followers and its corresponding cam to operatively engage at a time, said latch devices including double ended pawls pivotally associated with said cam followers, one end of said pawls being adapted to hook on said bar or pass through a slot thereof depending upon the position of said bar, and the other end of said pawls operatively connecting with said price counter.

8. In a device of the character described, the combination of primary and secondary counters, a power driven shaft, means for commonly operating said primary counter and said shaft from a source of power, a series of rotatable cams, means connecting said cams independently with said shaft for rotation at different speeds, means associated with said secondary counter for selective engagement with said cams to operate said secondary counter, and means controlled by said primary counter for selecting a given cam and rendering it effective.

9. A meter comprising: primary and secondary counters; a driven shaft; a common driving means for said primary counter and the driven shaft; a series of rotatable cams; means connecting the driven shaft with the rotatable cams to rotate the latter at different speeds; a series of cam follower elements corresponding to the cams and operable thereby; movable selector means arranged to successively release the cam followers for operative engagement with corresponding cams; and means, rendered effective by movement of a cam follower, to drive the secondary counter by the driving means.

10. A meter comprising: primary and secondary counters; a driven shaft; a common driving means for said primary counter and the driven shaft; a series of rotatable cams; means connecting the driven shaft with the rotatable cams to rotate the latter at different speeds; a series of cam follower elements corresponding to the cams and operable thereby; movable selector means controlled by the primary counter arranged to successively release the cam followers for operative engagement with corresponding cams; and means, rendered effective by movement of a cam follower, to drive the secondary counter by the driving means.

11. In a device of the character described, the combination comprising: a movable driving means, a first counter driven thereby, a second counter, a plurality of rotatable cams driven at different rates of speed from said driving means, a corresponding plurality of actuating elements for said second counter adapted to be engaged and moved to actuate said second counter by respective rotatable cams, said actuating elements being movable between inoperative positions out of the path of said cams and operative positions in which they are engaged and moved by said cams, and means under control of said first counter for positioning said actuating elements in said operative positions in predetermined succession.

12. In a device of the character described, the combination of: drive means, a unit of flow counter, a value counter, a series of actuating elements for said value counter rotatable at differential rates by said drive means, a corresponding series of selective elements adapted to be selected one at a time and thrown into operative association for oscillative movement by respective actuating elements, means for operating said value counter in accordance with oscillation of any of said selective elements, and selector means controlled by said unit of flow counter for selecting said selective elements one at a time in predetermined order and throwing them into operative association with their respective rotating actuating elements.

13. A combination as defined in claim 12, in which the value counter is resettable to a minimum value position, and in which selection of the first selective element is delayed until after an initial period of operation.

14. In a device of the character described, the combination of: drive means, a unit of flow counter operable by said drive means, a price counter, a series of rotatable cams operable at differential rates by said drive means, a corresponding series of selective, pivotally mounted cam actuated elements normally positioned in inactive positions and adapted to be released one at a time for movement into operative association with respective cams for oscillation thereby; means, actuated by said drive means, for operating said price counter in accordance with the rate of oscillation of any released one of said selective elements, and selector means controlled by said unit of flow counter for selecting and releasing said selective elements one at a time in predetermined order.

15. In a device of the character described, the combination of: drive means, a price counter, a series of rotatable cams operable at differential rates by said drive means, a corresponding series of selective, pivotally mounted cam actuated elements normally positioned in inactive positions and adapted to be released one at a time for movement into operative association with respective cams for oscillation thereby; means, actuated by said drive means, for operating said price counter in accordance with the rate of oscillation of any released one of said selective elements, and selector means for selecting and releasing said selective elements one at a time in predetermined order.

16. In a device of the character described, the combination of: drive means, a price counter, a series of rotatable cams operable at differential rates by said drive means, a corresponding series of selective, pivotally mounted cam actuated levers, means on said levers normally latching them out of operative association with said cams, said levers when unlatched moving into operative association with respective cams for oscillation thereby; means, actuated by said drive means, for operating said price counter in accordance with the rate of oscillation of any unlatched one of said levers, and selector means for selecting and unlatching said levers one at a time in predetermined succession.

17. In a device of the character described, the combination of: drive means, a value counter a series of rotatable cams operable at differential rates by said drive means, a corresponding series of selective, pivotally mounted cam actuated levers, means on said levers normally latching them out of operative association with said cams, said levers when unlatched moving into operative association with respective cams for oscillation thereby, a series of crank arms corresponding to said levers pivotally mounted coaxially with said levers, means for locking any released lever to its respective crank arm whereby said crank arm is oscillated with said lever, means for operating said value counter in accordance with the rate of oscillation of any one of said crank arms, and selector means for selecting and unlatching said levers one at a time in predetermined succession.

18. In a device of the character described, the combination of: drive means, a unit of flow counter operable by said drive means, a value counter, a series of rotatable cams operable at differential rates by said drive means, a corresponding series of selective, pivotally mounted cam actuated levers normally positioned out of the path of said cams but adapted to move into positions of operative association therewith when released, a rate change bar movable in a succession of steps in a longitudinal direction under control of said unit of flow counter, latches on said levers engageable on said bar to hold said levers in said normal positions out of said operative association with said cams, notches in said bar registerable one at a time with said latches to successively release said latches as said bar moves to its successive positions, the latch on each previously released lever being adapted to become reengaged on said bar when its respective notch moves out of register therewith, and means for operating said value counter in accordance with the rate of oscillation of any released cam actuated lever.

19. In a device of the character described, the combination of: drive means, a unit of flow counter operable by said drive means, a value counter, a series of rotatable cams operable at differential rates by said drive means, a corresponding series of selective, pivotally mounted cam actuated levers normally positioned out of the path of said cams but adapted to move into positions of operative association therewith when released, a rate change bar movable in a succession of steps in a longitudinal direction under control of said unit of flow counter, latches on said levers engageable on said bar to hold said levers in said normal positions out of said operative association with said cams, notches in said bar registerable one at a time with said latches to successively release said latches as said bar moves to its successive positions, the latch on each previously released lever being adapted to become reengaged on said bar when its respective notch moves out of register therewith, a series of crank arms pivotally mounted coaxially with said levers, means for locking any released lever to its respective crank arm whereby said crank arm is oscillated with said lever, and means for operating said value counter in accordance with the rate of oscillation of any one of said crank arms.

20. In a device of the character described, the combination of: drive means, a unit of flow counter comprising a plurality of decimally operable counter wheels operable by said drive means, a series of peripherally notched rings rotatable with each of said counter wheels, a value counter, a series of rotatable cams operable at differential rates by said drive means, a corresponding series of selective, pivotally mounted cam actuated levers normally positioned out of the path of said cams but adapted to move into positions of operative association therewith when released, a rate change bar longitudinally movable along said peripherally notched rings, said bar carrying a plurality of lugs, one for the series of rings associated with each counter wheel, engageable with the sides of corresponding members of said series of rings and adapted to pass through the notches therein when said notches all align with said lugs, whereby said bar advances longitudinally of said rings in a succession of steps, latches on said levers in said normal positions engageable on said bar to hold said levers out of said operative association with said cams, notches in said bar registerable one at a time with said latches to successively release said latches as said bar moves to its successive positions under control of said notched rings, the latch on each previously released lever being adapted to become reengaged on said bar when its respective notch moves out of register therewith, and means for operating said value counter in accordance with the rate of oscillation of any released cam actuated lever.

21. In a device of the character described, the combination of: drive means, a unit of flow counter comprising a plurality of decimally operable counter wheels operable by said drive means, a series of peripherally notched rings rotatable with each of said counter wheels, a value counter, a series of rotatable cams operable at differential rates by said drive means, a corresponding series of selective, pivotally mounted cam actuated levers normally positioned out of the path of said cams but adapted to move into positions of operative association therewith when released, a rate change bar longitudinally movable along said peripherally notched rings, said bar carrying a plurality of lugs, one for the series of rings associated with each counter wheel, engageable with the sides of corresponding members of said series of rings and adapted to pass through the notches therein when said notches all align with said lugs, whereby said bar advances longitudinally of said rings in a succession of steps, latches on said levers engageable on said bar to hold said levers in said normal positions out of said operative association with said cams, notches in said bar registerable one at a time with said latches to successively release said latches as said bar moves to its successive positions under control of said notched rings, the latch on each previously released lever being adapted to become reengaged on said bar when its respective notch moves out of register therewith, means for operating said value counter in accordance with the rate of oscillation of any released cam actuated lever, and means for moving said lugs on said rate change bar to clear said rings to permit longitudinal return movement of said bar.

22. In a device of the character described, the combination of: drive means, a unit of flow counter comprising a plurality of decimally operable counter wheels operable by said drive means, a series of peripherally notched rings rotatable with each of said counter wheels, a value counter, a series of rotatable cams operable at differential rates by said drive means, a corresponding series of selective, pivotally mounted cam actuated levers normally positioned out of the path of said cams but adapted to move into positions of operative association therewith when released, a rate change bar longitudinally movable along said peripherally notched rings, said bar carrying a plurality of lugs, one for the series of rings associated with each counter wheel, engageable with the sides of corresponding members of said series of rings and adapted to pass through the notches therein when said notches all align with said lugs, whereby said bar advances longitudinally of said rings in a succession of steps, latches on said levers engageable on said bar to hold said levers in said normal positions out of said operative association with said cams, notches in said bar registerable one at a time with said latches to successively release said latches as said bar moves to its successive positions under control of said notched rings, the latch on each previously released lever being adapted to become reengaged on said bar when its respective notch moves out of register therewith, means for operating said value counter in accordance with the rate of oscillation of any released cam actuated lever, and means for simultaneously moving said lugs on said rate change bar to a position of clearance with respect to said rings and said rate change bar longitudinally in a reverse direction to starting position.

23. In a device of the character described, the combination of: drive means, a unit of flow counter comprising a plurality of decimally operable counter wheels operable by said drive means, a series of peripherally notched rings rotatable with each of said counter wheels, a value counter, a series of rotatable cams operable at differential rates by said drive means, a corresponding series of selective, pivotally mounted cam actuated levers normally positioned out of the path of said cams but adapted to move into positions of operative association therewith when released, a rate change bar longitudinally movable along said peripherally notched rings, said bar including a tranversely movable element carrying a plurality of lugs, one for the series of rings associated with each counter wheel, engageable with the sides of corresponding members of said series of rings and adapted to pass through the notches therein when said notches all align with said lugs, whereby said bar advances longitudinally of said rings in a succession of steps, latches on said levers engageable on said bar to hold said levers in said normal positions out of said operative association with said cams, notches in said bar registerable one at a time with said latches to successively release said latches as said bar moves to its successive positions under control of said notched rings, the latch on each previously released lever being adapted to become reengaged on said bar when its respective notch moves out of register therewith, means for operating said value counter in accordance with the rate of oscillation of any released cam actuated lever, and means for moving and holding said transversely movable element on said rate change bar to a position in which said lugs clear said rings to permit moving said rate change bar longitudinally in a reverse direction to starting position.

24. In a device of the character described, the combination of: a prime mover; a primary counter operated thereby; a secondary counter; a series of cams differentially operable by said prime mover; and actuating means for said secondary counter adapted for sequential cooperation with said cams under control of said primary counter.

25. In a device of the character described, the combination of: a prime mover; a counter; a series of cams differentially operable by said prime mover; and actuating means for said counter adapted for predetermined sequential cooperation with said cams.

26. In a device of the character described, the combination of: a prime mover; a primary counter operated thereby; a secondary counter operable by said prime mover; and actuating means for causing operation of said secondary counter by said prime mover at varying rates with respect to the operation of the prime mover including a series of actuating cams operable at different speeds by the prime mover, and cam operable actuating mechanism movable into cooperation with said cams one at a time in predetermined sequential order at predetermined points in the operation of said primary counter, said actuating mechanism effecting temporary driving interconnection between said prime mover and said secondary counter at differential intervals governed by the speeds of the cams with which said mechanism is successively placed in cooperation.

27. In a device of the character described, the combination of: a prime mover; a counter operable by said prime mover; and actuating means for causing operation of said counter by said prime mover at varying rates with respect to the operation of said prime mover including a series of actuating cams operable at different speeds by prime mover, and cam operable actuating mechanism movable into cooperation with said cams one at a time in predetermined sequential order at predetermined points in the operation of said prime mover, said actuating mechanism effecting temporary driving interconnection between said prime mover and said counter at differential intervals governed by the speeds of the cams with which said mechanism is successively placed in cooperation.

28. In a device of the character described, the combination of: a driving means energized by flow of a commodity; a series of cams differentially operable by the driving means; a corresponding series of cam followers adapted to move selectively into operative association with the cams in a predetermined succession; a movable selector assembly to successively move the cam followers into operative association with the cams; a control means, driven by the driving means, arranged to control the movement of the selector assembly; a counter; and means, rendered effective by movement of a cam follower, to drive the counter by the driving means.

29. In a device of the character described, the combination of: a reciprocating driving means intermittently energized by flow of a commodity; a series of cams; means for rotating the cams in one direction and at different speeds by the driving means; a corresponding series of cam followers adapted to move selectively into operative association with the cams in a predetermined succession; a movable selector assembly to successively move the cam followers into operative association with the cams; a control means, driven by the driving means, arranged to control the movement of the selector assembly; a counter; and means, rendered effective by movement of a cam follower, to drive the counter by the driving means.

30. In a device of the character described, the combination of: a driving means energized by flow of a commodity; a series of cams rotated at different speeds by the driving means; a corresponding series of cam followers adapted to move selectively into operative association with the cams in a predetermined succession; a movable selector assembly to successively move the cam followers into operative association with the cams; a primary counter driven by the driving means, said primary counter including a control means arranged to control the movement of the selector assembly; a secondary counter; and means, rendered effective by movement of a cam follower, to drive the secondary counter by the driving means.

31. A device of the character stated in claim 30 wherein the control means includes a plurality of peripherally notched rings sequentially rotatable by the primary counter.

32. In a device of the character described, the combination comprising: a drive means, a counter, a normally inactive operative driving train between said driving means and said counter, said driving train being adapted to be actuated periodically to operate said counter from said driving means; means for actuating said driving train at different rates relative to the rate of operation of said driving means embodying a series of differentially operating actuation control elements outside said driving train but driven by said driving means, means selective to operate with any one of said actuation control elements and adapted to control actuation of said driving train to cause operation of said counter; a selector means for the counter, and a second counter driven directly by said driving means.

33. In a device of the character described, the combination of: a driving means energized by flow of a commodity; a primary counter driven by the driving means; a secondary counter; a series of cams driven by the driving means at different rates of speed; and actuation control means adapted for sequential cooperation with said cams to actuate a drive of the secondary counter by the driving means.

WILLIAM J. PEARSON.